US 8,505,386 B2

(12) United States Patent
Colombo et al.

(10) Patent No.: US 8,505,386 B2
(45) Date of Patent: Aug. 13, 2013

(54) PRESSURE SENSOR DEVICE

(75) Inventors: Paolo Colombo, Alessandria (IT); Domenico Cantarelli, Casale Monferrato (IT); Marco Bigliati, Casale Monferrato (IT); Mauro Zorzetto, Casale Monferrato (IT); Fabio Nebbia, Casale Monferrato (IT); Giorgio Martinengo, Casale Monferrato (IT)

(73) Assignee: Eltek S.p.A., Casale Monferrato (Alessandria) (IT)

( * ) Notice: Subject to any disclaimer, the term of this patent is extended or adjusted under 35 U.S.C. 154(b) by 132 days.

(21) Appl. No.: 13/000,287

(22) PCT Filed: Jun. 17, 2009

(86) PCT No.: PCT/IB2009/052568
§ 371 (c)(1),
(2), (4) Date: Feb. 25, 2011

(87) PCT Pub. No.: WO2009/153737
PCT Pub. Date: Dec. 23, 2009

(65) Prior Publication Data
US 2011/0138924 A1 Jun. 16, 2011

(30) Foreign Application Priority Data
Jun. 19, 2008 (IT) .............. TO2008A0484

(51) Int. Cl.
*G01L 19/14* (2006.01)
*G01L 19/04* (2006.01)
(52) U.S. Cl.
USPC .............................. 73/756; 73/715

(58) Field of Classification Search
USPC .................................... 73/756, 715
See application file for complete search history.

(56) References Cited

U.S. PATENT DOCUMENTS 4,767,897 A * 8/1988 Betterton et al. ............. 200/83 J
5,587,535 A * 12/1996 Sasaki et al. .................... 73/726
(Continued)

FOREIGN PATENT DOCUMENTS
EP  1 584 910  10/2005
WO  WO 2008078184 A2 * 7/2008

OTHER PUBLICATIONS
International Search Report for PCT/IB2009/052568, mailed Nov. 20, 2009.
(Continued)

*Primary Examiner* — Lisa Caputo
*Assistant Examiner* — Punam Roy
(74) *Attorney, Agent, or Firm* — Nixon & Vanderhye P.C.

(57) ABSTRACT

A pressure sensor device comprises a casing (2a, 3 a) defining a chamber (20) and an inlet passage (14a, 14b) of the chamber. Accommodated in the chamber (20) is a pressure sensor (17) having a sensor body with a cavity and a membrane capable of deformation under pressure action of a fluid present in the inlet passage (14a, 14b). The device further comprises a circuit arrangement (26, 27, 30) to which the pressure sensor (17) is electrically connected, the circuit arrangement including a circuit support at least partially accommodated in the chamber (20). The sensor body is not rigidly associated to the casing (2a, 3 a) and/or to other parts of the device (26, 27, 30, 35), i.e. it is mounted elastically or in a moveable manner with respect to the casing (2a, 3 a) and/or to said other parts (26, 27, 30, 35) inside the chamber (20).

20 Claims, 22 Drawing Sheets

(56) References Cited

U.S. PATENT DOCUMENTS

| | | | |
|---|---|---|---|
| 6,131,467 A * | 10/2000 | Miyano et al. | 73/756 |
| 6,142,020 A * | 11/2000 | Kim et al. | 73/714 |
| 6,186,009 B1 * | 2/2001 | Miyano et al. | 73/756 |
| 7,036,385 B2 * | 5/2006 | Murai | 73/756 |
| 7,150,198 B2 * | 12/2006 | Kaneko et al. | 73/756 |
| 7,240,558 B2 * | 7/2007 | Ernsberger et al. | 73/719 |
| 7,478,560 B2 * | 1/2009 | Kuznia et al. | 73/724 |
| 7,663,496 B2 * | 2/2010 | Kawakami et al. | 340/626 |
| 7,900,520 B2 * | 3/2011 | Colombo | 73/754 |
| 2003/0140703 A1 * | 7/2003 | Weigl | 73/715 |
| 2007/0121701 A1 | 5/2007 | Gennissen et al. | |
| 2008/0250862 A1 * | 10/2008 | Nakabayashi | 73/756 |
| 2011/0174080 A1 * | 7/2011 | Zorzetto et al. | 73/756 |

OTHER PUBLICATIONS

Written Opinion of the International Searching Authority for PCT/IB2009/052568, mailed Nov. 20, 2009.

* cited by examiner

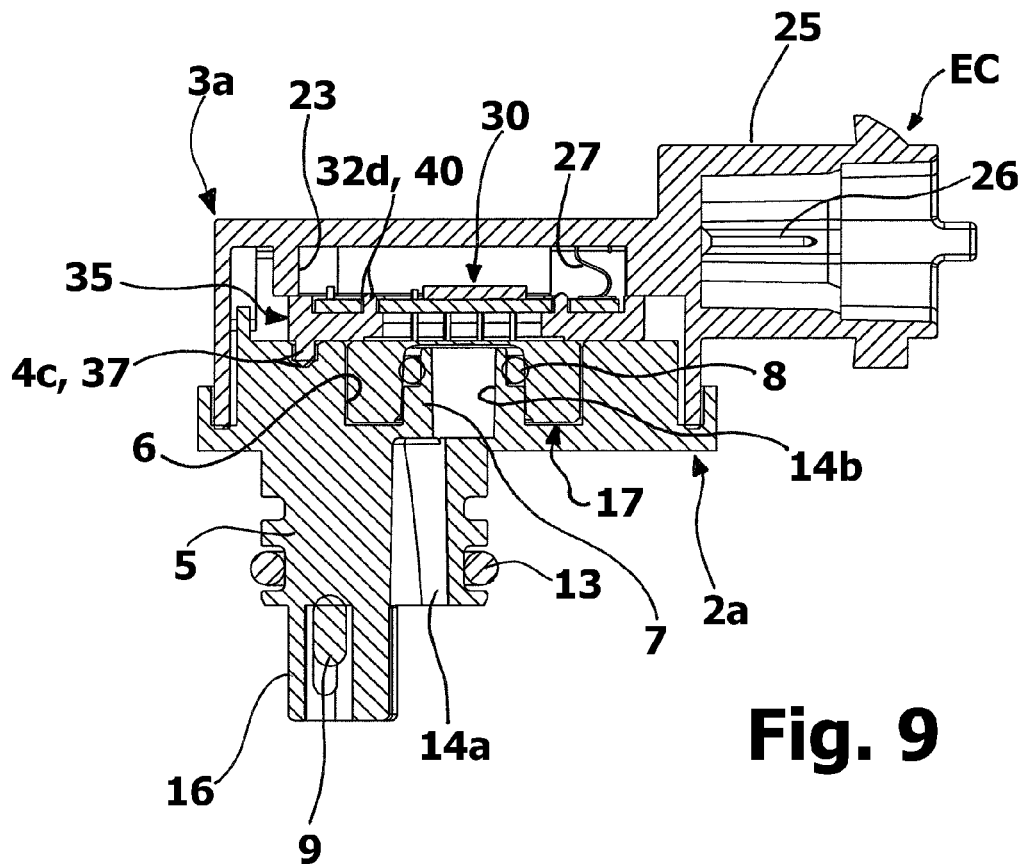
Fig. 9
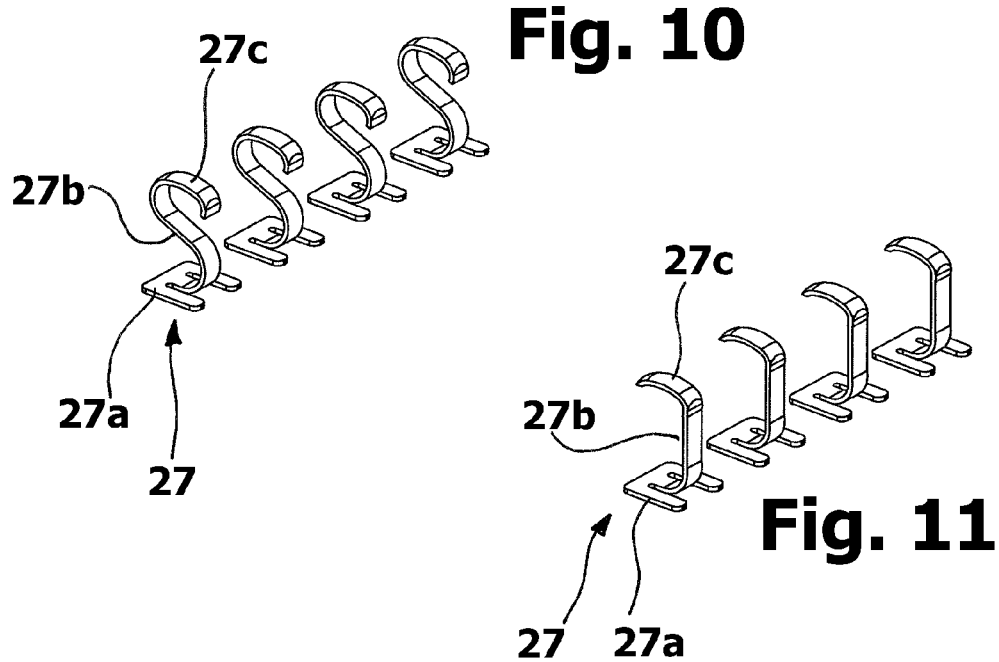
Fig. 10
Fig. 11

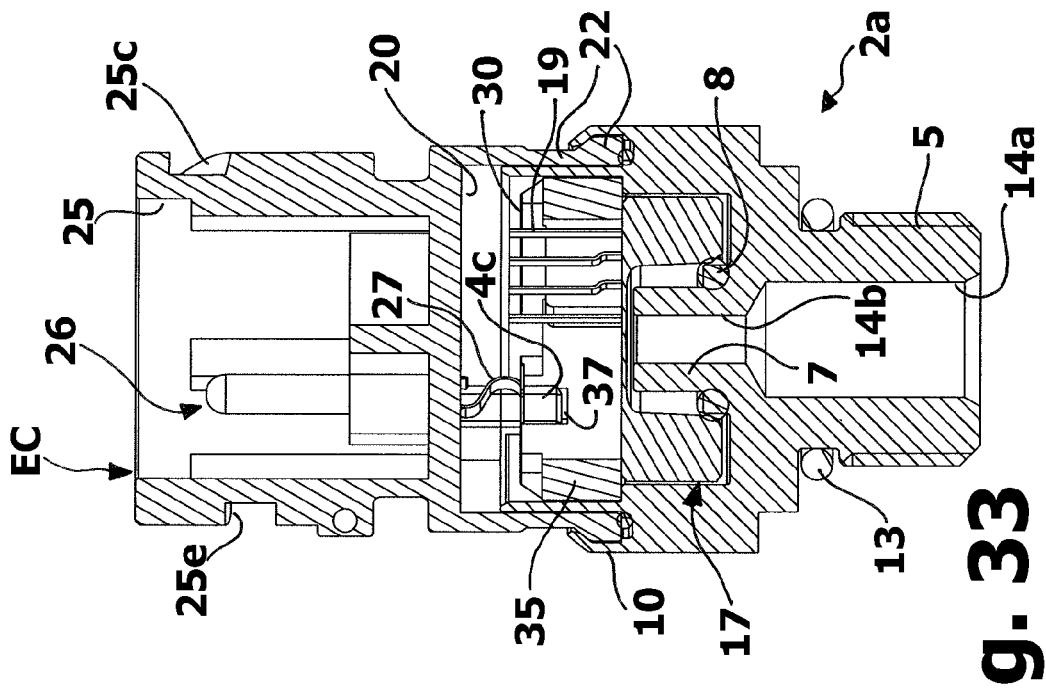
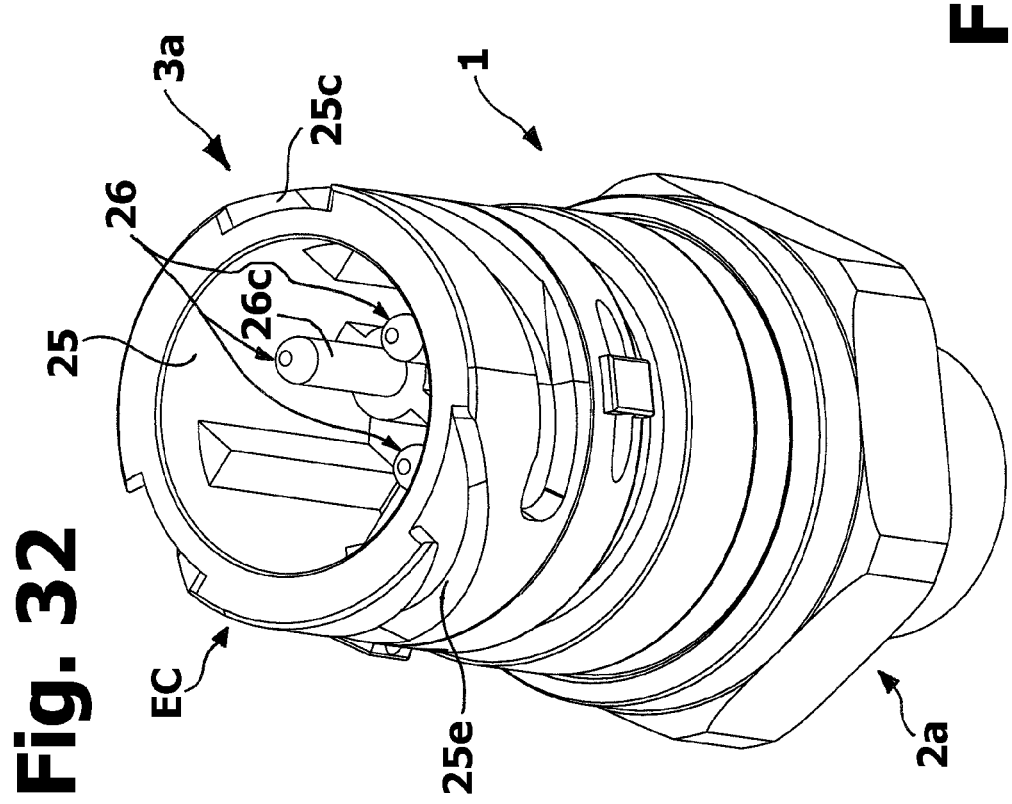
Fig. 32
Fig. 33

PRESSURE SENSOR DEVICE

This application is the U.S. national phase of International Application No. PCT/IB2009/052568, filed 17 Jun. 2009, which designated the U.S. and claims priority to Italian Application No. TO2008A000484, filed 19 Jun. 2008, the entire contents of each of which are hereby incorporated by reference.

FIELD OF THE INVENTION

The present invention refers to a pressure sensor device.

The invention has a preferred, but not exclusive, application in sensor devices of the type comprising:
- a casing defining a chamber with an inlet passage,
- a pressure sensor having a sensor body with a detection membrane, the sensor body being at least partially accommodated in the chamber in such a manner that the membrane be susceptible to deformation under the action of the pressure of a fluid present in the inlet passage,
- a circuit arrangement to which the pressure sensor is electrically connected, the circuit arrangement in particular including a circuit support at least partially accommodated in the chamber.

BACKGROUND ART

In the known devices of the indicated type the fluid subjected to measurement is supplied, through a tubular inlet, to a detection chamber of the casing, accommodated in which is the sensor, in such a manner that the latter detects the pressure of the fluid. The body of the sensor has a membrane portion and is welded or rigidly fixed into the chamber, typically at the tubular inlet or on the circuit support. The pressure of the fluid is such to cause a flexure of the membrane portion of the sensor and the amount of such flexure, which depends on the pressure of the fluid, is measured through a detection element provided for on the membrane portion. The output signal generated by the detection element, representing the pressure value, is preferably processed and/or amplified and/or conditioned by a circuit arrangement, which may comprise a printed circuit board directly accommodated in the casing of the device. The device is connected—by means of a connector—to an external system, such as for example an automobile engine control unit.

The known devices of the indicated type have a relatively complex structure, they have reliability problems in the long-term and they are difficult to produce from an industrial point of view. Production of such devices is difficult to automate due to the small dimensions and the inherent delicateness of the interior components, and specifically the dimensions of the pressure sensor and of the possible printed circuit board.

SUMMARY OF THE INVENTION

In general terms, the present invention proposes providing a pressure sensor device that is inexpensive to manufacture, easy and accurate to mount as well as reliable in use over time. Another aim of the invention is that of obtaining a sensor device of the indicated type whose assembly may be carried out at least partially in an automated manner, without being exposed to the risk of damaging the most delicate components of the device itself while simultaneously guaranteeing the required mounting accuracy.

One or more of these objects are attained, according to the present invention, by a pressure sensor device having the characteristics of the attached claims, which form an integral part of the technical teaching provided herein in relation to the invention.

In general terms, the invention regards a pressure sensor device comprising:
- a casing defining a chamber with an inlet passage,
- a pressure sensor having a sensor body with a cavity and a detection membrane, the membrane being defined by the sensor body or being associated thereto, the sensor body being at least partially accommodated in the chamber such that the membrane is susceptible to deformation under the action of the pressure of a fluid present in the inlet passage,
- a circuit arrangement to which the pressure sensor is electrically connected, the circuit arrangement including in particular a circuit support at least partially accommodated in the chamber.

In an inventive embodiment the sensor body is not rigidly associated to the casing, i.e. it is mounted elastically with respect to the casing and/or to other parts of the device inside the chamber, preferably through at least one seal element or gasket.

According to another inventive embodiment the sensor body is in a spaced position with respect to the circuit support inside the chamber.

According to another inventive embodiment, accommodated in the chamber is a spacer body, configured as a separate component with respect to the pressure sensor, to the circuit support and to the casing, the spacer body being at least partially interposed between the sensor body and the circuit support.

According to another inventive embodiment the circuit arrangement comprises an electric connector including connection terminals each having a first portion which is extended inside the chamber and a second portion which is extended outside the chamber and wherein operatively interposed between the first portion of the terminals and the circuit support are elastic contact elements, the elastic contact elements being configured and arranged to be in a compression condition between the first portion of the terminals and the circuit support, particularly with the aim of compensating possible positioning tolerances or movements between parts of the device.

According to another inventive embodiment, accommodated inside the chamber is a positioning body for at least one of the circuit support and the sensor body, the positioning body being configured as a distinct part with respect to the casing and comprising reference and/or positioning elements, particularly in form of appendages and/or projections and/or seats and/or openings, for at least one of the sensor body and the circuit support.

According to another inventive embodiment, the casing is made up of at least one first and one second casing part coupled together and accommodated inside the chamber is a body for positioning at least one of the circuit support and the sensor body, the positioning body being mechanically constrained to at least part of the casing.

According to another inventive embodiment the device comprises means for shielding against disturbances due to electromagnetic interferences, in particular including a layer of electrically conductive material on a surface of the casing defining at least part of the cavity, such as a paint, ink, paste or electrically conductive plastic, preferably applied or moulded.

According to another inventive embodiment, the device also has at least one ventilation hole, different from the fluid inlet passage, for communicating the chamber with the external environment, associated to the hole being respective protection means, in particular comprising at least one of a protection wall and a membrane permeable to the air and impermeable to moisture.

These and other independently inventive embodiments described hereinafter may also be combined together, with the aim of obtaining a pressure sensor device which thus, in the practical implementation thereof, may comprise one or more of the characteristics of the independently inventive embodiments.

BRIEF DESCRIPTION OF THE DRAWINGS

Further objects, characteristics and advantages of the present invention shall be apparent from the detailed description that follows and from the attached drawings, strictly provided for exemplifying and non-limiting purposes, wherein:

FIG. 9 is a transverse sectional view of the device of FIGS. 1 and 2;

FIGS. 10 and 11 are perspective views of two possible alternative embodiments of flexible contact elements of the device of FIGS. 1 and 2;

FIG. 32 is a perspective view of a pressure sensor device according to a sixth inventive embodiment;

FIG. 33 is a schematic section of the device of FIG. 32;

DESCRIPTION OF PREFERRED EMBODIMENTS OF THE INVENTION

As a non-limiting example let us suppose that the sensor devices according to the various embodiments described hereinafter are intended for use in vehicles, such as internal combustion engine vehicles, for example in combination with a system for controlling emissions of nitrogen oxides ($NO_x$), or in combination with a fuel supply or injection system for a vehicle or with a lubrication system; in the first case, the fluid subject to pressure measurement may be for example ammonia in aqueous solution or urea while in the second case the fluid may be a fuel, such as gas oil, or a lubricating oil, such as engine oil. Sensor devices described hereinafter are however suitable for use also in other fields, such as domestic appliances, heating or air conditioning as well as in the hydrosanitary and heating industry, or water systems in buildings or residential houses, with the aim of detecting the fluid pressure (liquids or aeriform mediums) used in such fields, such as for example water or mixtures of water with other substances (for example water mixed with glycol or any other substance adapted to prevent the liquid in a system or circuit from freezing).

Figure 1:
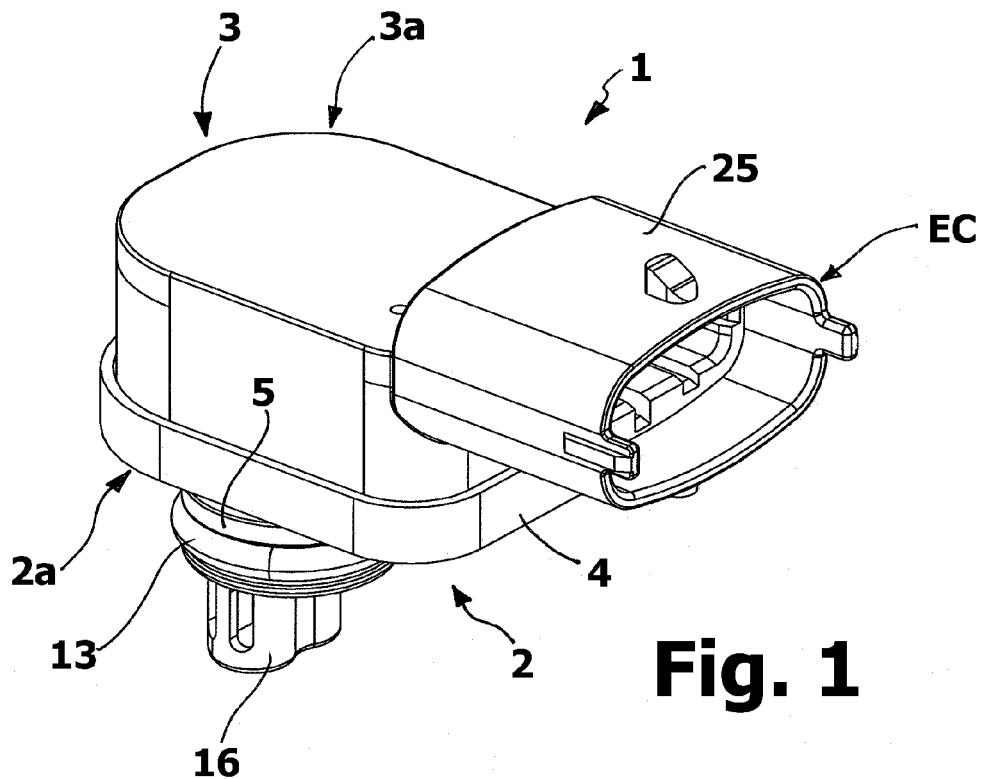
FIGS. 1 and 2 are perspective views, from different angles, of a pressure sensor device according to a first inventive embodiment.
Figure 2:
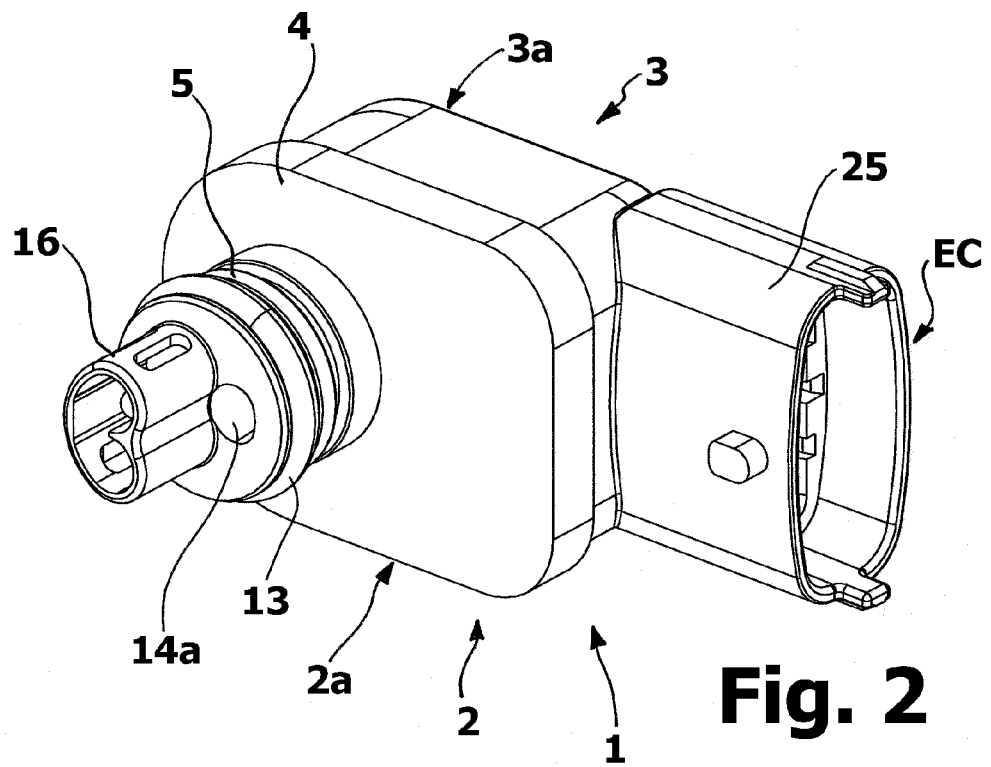
Figure 3:
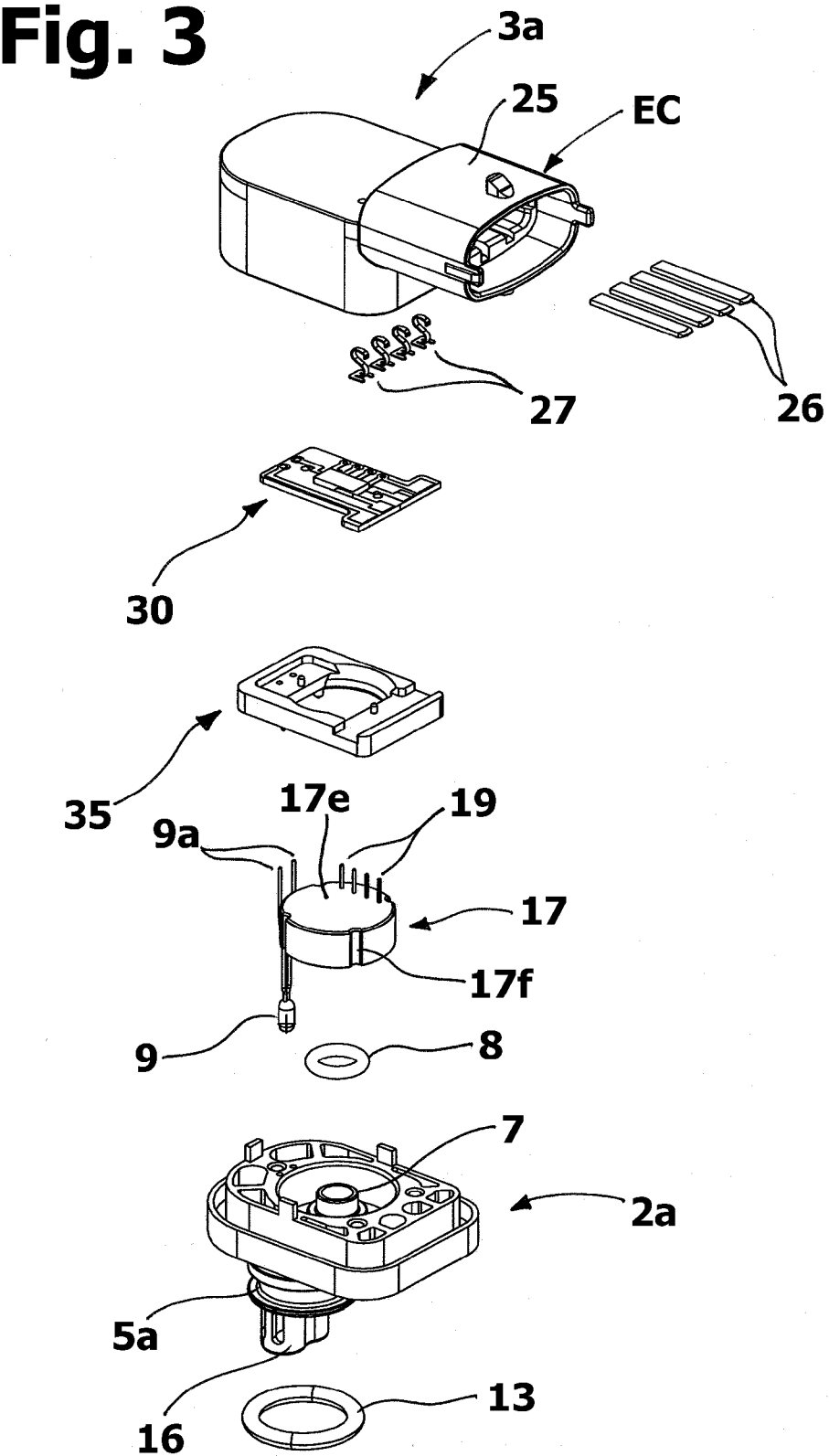
FIGS. 3 and 4 are exploded views, from different angles, of the device of FIGS. 1 and 2, in smaller scale.

With reference to FIGS. 1 and 2, indicated in its entirety with 1 is a pressure sensor device according to an invention embodiment, identified in whose structure are two main parts, indicated with 2 and 3 only in FIGS. 1 and 2: part 2 essentially has accommodation/support and hydraulic connection functions, while part 3 essentially has cover and electrical connection functions. The bodies of the two parts 2 and 3, indicated with 2a and 3a in the figures, are mutually coupled, preferably but not necessarily sealingly, to obtain a casing for internal components of the device 1, as deducible from the exploded views of FIGS. 3 and 4. The body 2a is preferably made using relatively rigid material such as for example thermoplastic material or metal material; the body 3a is preferably made using thermoplastic material and/or electrically insulating material. The two parts 2 and 3, or bodies 2a and/or 3a, are preferably made at least partially through a moulding process.

The body 2a has a support portion 4 and a connection portion 5. As observable particularly in FIG. 5, the support portion 4 has an essentially prism-shaped central part 4a, defined in which is a cavity or chamber 6, preferably substantially cylindrical shaped, open at one end. Rising from the bottom of the chamber 6—in central position—is a tubular part 7, preferably generally cylindrical, formed externally thereon is a step or a seat 7a for positioning radial seal means, preferably represented by an o-ring gasket, indicated with 8 for example in FIGS. 3, 4 and 8. The central part 4a of the body 2a has, in peripheral position with respect to the chamber 6, lightening blind cavities 4b and blind seats 4c for positioning projections or pins for a support and separation member, described hereinafter, such cavities 4b and seats 4c opening on the top face (with reference to FIG. 5) of the body 2a. The central part 4a is also provided, in a decentralised position with respect to the chamber 6, with two through holes 4d, for terminals or rheophores of an element sensitive to the fluid temperature. The abovementioned element sensitive to the temperature, hereinafter referred to as "temperature sensor" for simplification purposes and which can for example be a negative temperature coefficient resistor or NTC, is indicated with 9 in FIGS. 3-9, and the respective rheophores are indicated with 9a.

Figure 5:
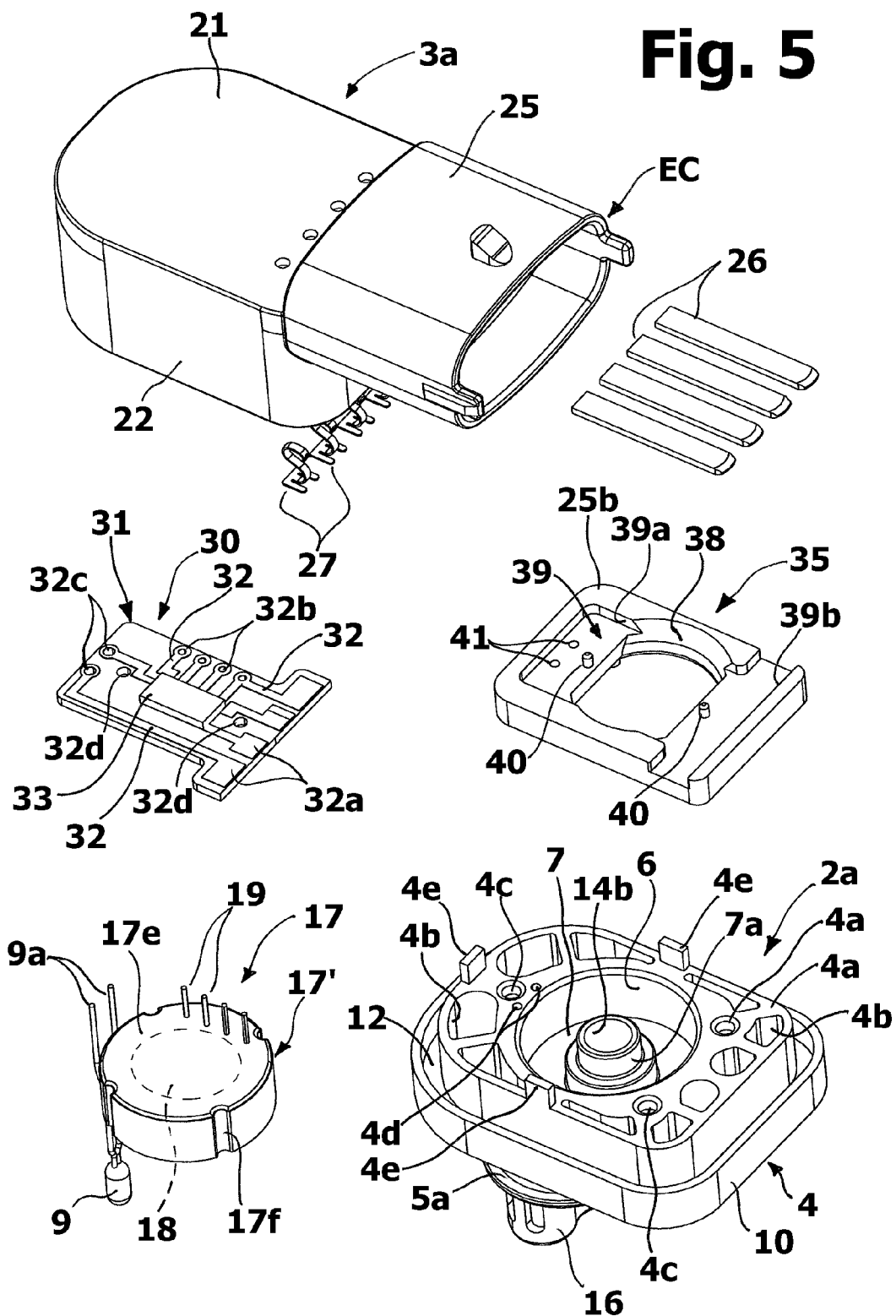
FIGS. 5 and 6 are exploded views, from different angles, of components of FIGS. 3 and 4, in an enlarged scale.
Figure 6:
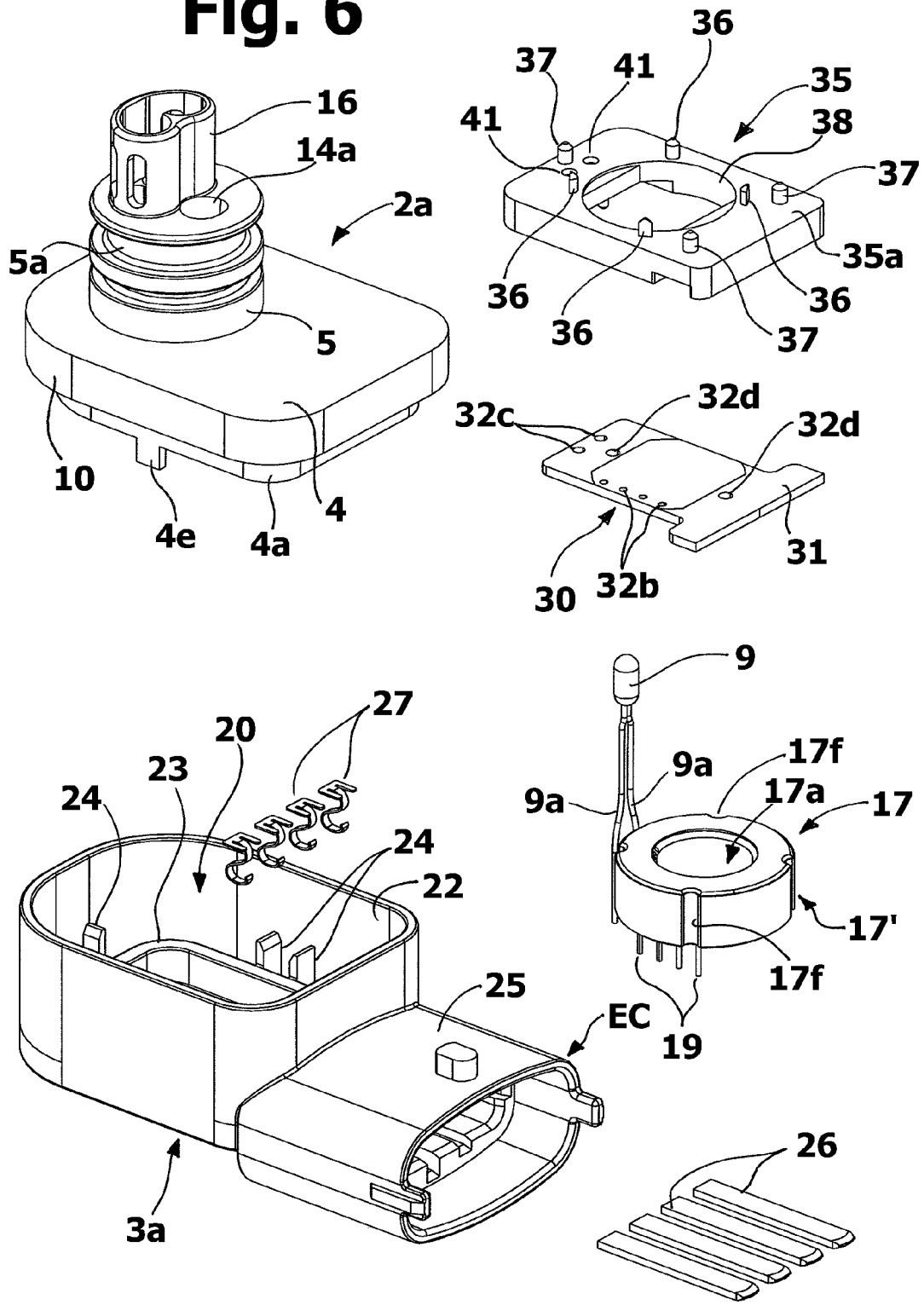

Rising from the top face of the central part 4a of the body 2a are peripheral positioning projections, indicated with 4e for example in FIGS. 5 and 6. Still with reference to FIGS. 5 and 6, the support portion 4 of the body 2a also has a peripheral wall 10, preferably shorter with respect to the central part 4a and which surrounds the latter: thus defined between such wall 10 and the peripheral profile of the part 4a is a perimeter seat, indicated with 12 in FIG. 5.

Figure 7:
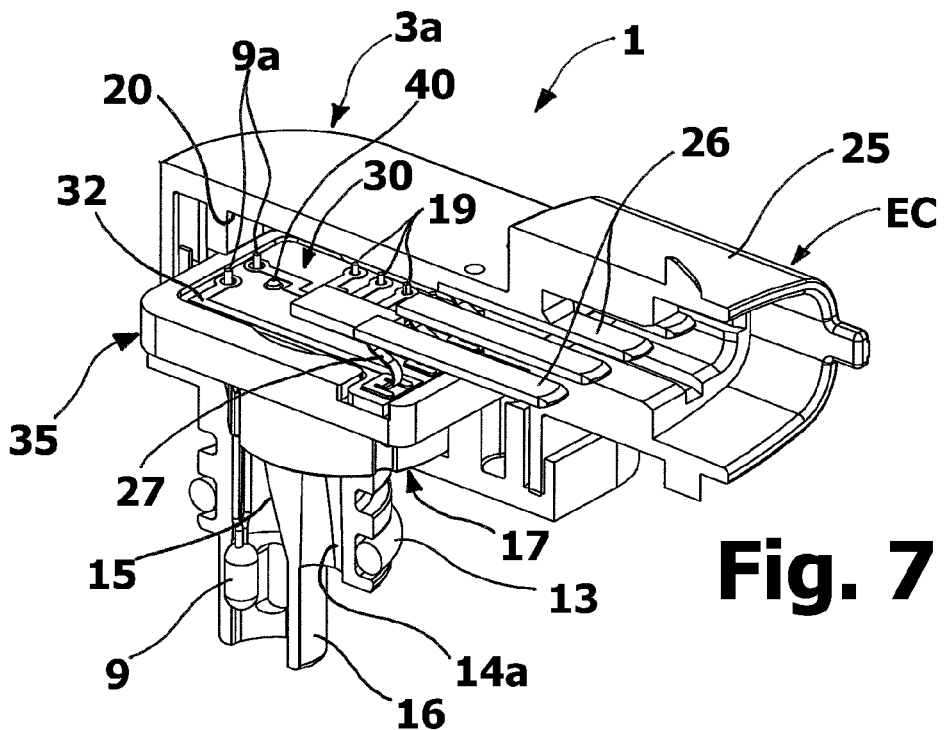
FIGS. 7 and 8 are perspective views in partial section of the device of FIGS. 1 and 2.
Figure 8:
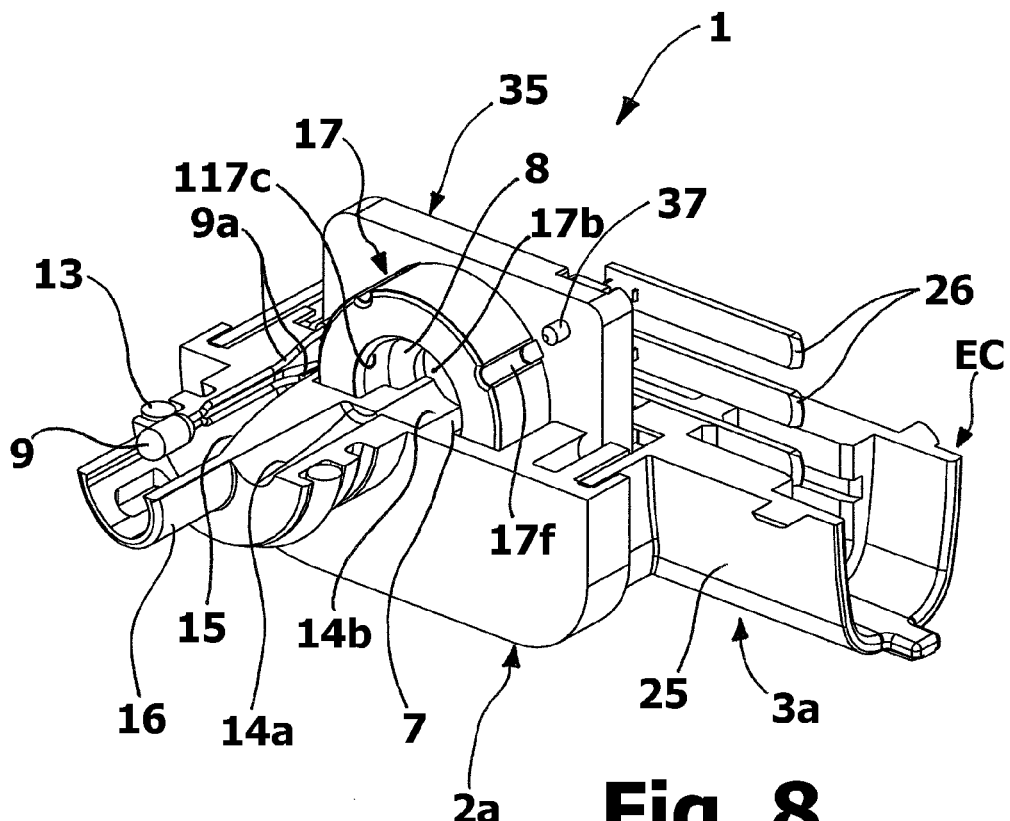
Figure 12:
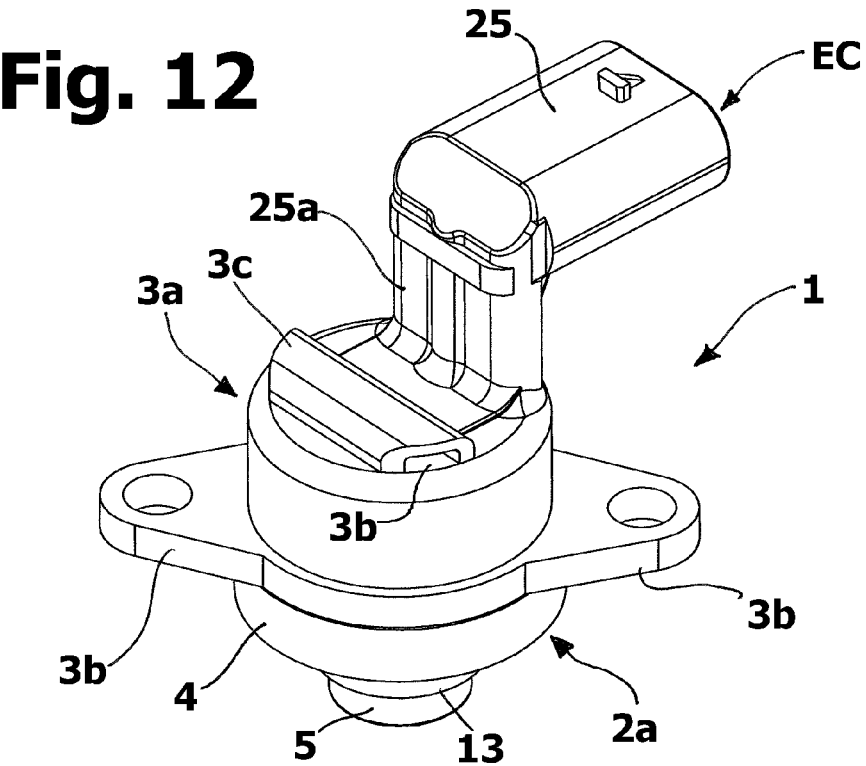
FIGS. 12 and 13 are perspective views, from different angles, of a pressure sensor device according to a second inventive embodiment.
Figure 13:
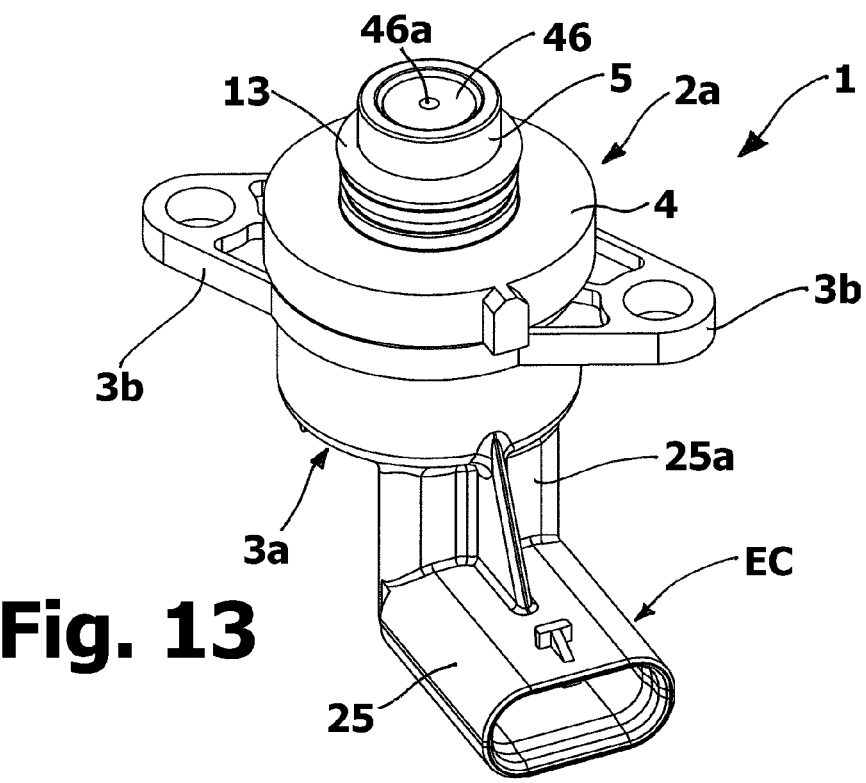
Figure 14:
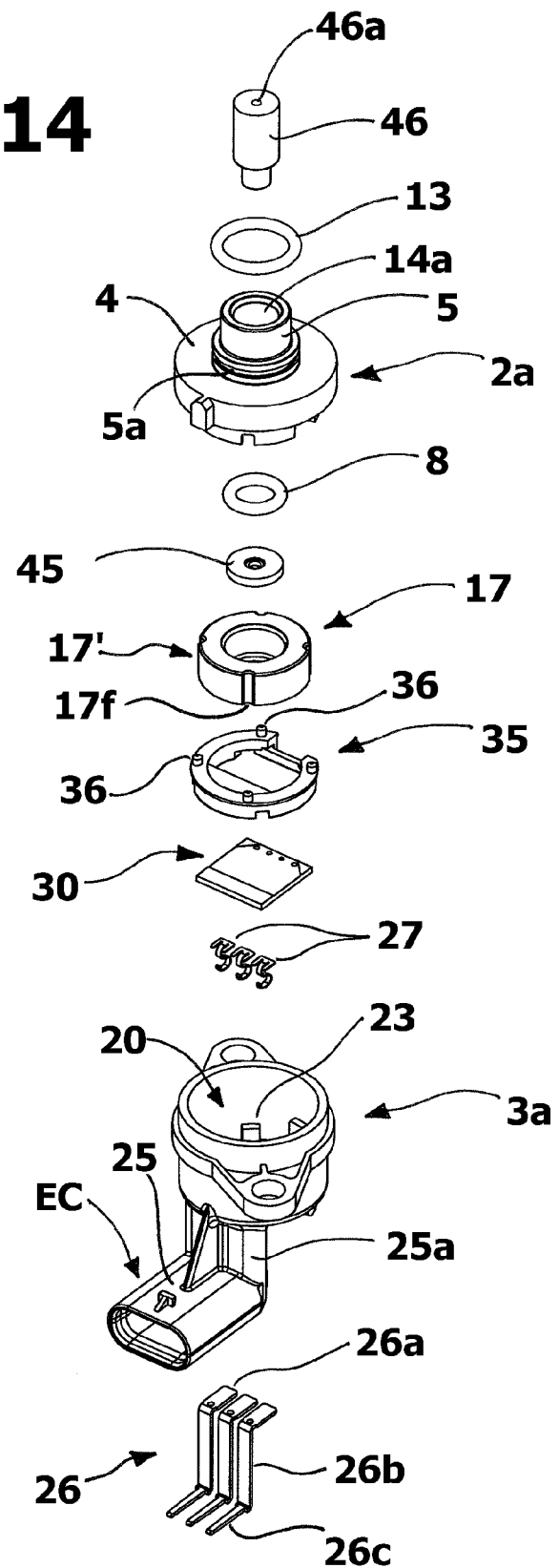
FIGS. 14 and 15 are exploded views, from different angles, of the device of FIGS. 12 and 13, in smaller scale.

With special reference to FIGS. 6, 7 and 8, the portion 5 of the body 2a is essentially configured as a hydraulic connection, preferably generally cylindrical-shaped and defining a seat 5a (FIG. 6) for a radial seal means, represented for example by an o-ring indicated with 13. The portion 5, which forms an inlet or pressure port of the device 1, is intended to be connected to a hydraulic circuit, not represented, containing the fluid to be, in the solution exemplified herein, subjected to pressure and temperature detection.

In the illustrated example the portion 5 is passed through in axial direction by two conduits. The first of these conduits is made up of two conduit sections 14a and 14b, axially offset but communicating with each other, as observable for example in FIGS. 8 and 9. The section 14a is open on the lower end (with reference to FIGS. 7 and 9) of the portion 5, while the section 14b passes through in the tubular part 7 which rises form the bottom of the chamber 6 (see FIGS. 8 and 9), forming an inlet passage of the device. The second conduit, indicated with 15, is extended axially through the portion 5 before branching into the two passages or holes 4d (see FIG. 5) of the central part 4a. The conduit 15 is intended to accommodate at least part of the temperature sensor 9, and in particular its rheophores 9a, with the main body of the sensor itself slightly projecting from the portion 5; for such purpose, the portion 5 is preferably provided with an end tubular appendage, 16 for protecting the sensor 9, having a perforated wall.

The chamber 6 is provided for at least partially accommodating a component sensitive to pressure, indicated in its entirety with 17; as observable in FIG. 9, the chamber 6 entirely or mainly accommodates the component 17, hereinafter referred to as "pressure sensor" for the sake of simplification. In a preferred but not exclusive embodiment the pressure sensor 17 has a monolithic body, indicated with 17' in FIGS. 5 and 6, for example made of ceramic, or plastic, or alumina, substantially cylindrical-shaped. Defined in the body 17' of the sensor 17 is a blind axial cavity, indicated with 17a in FIG. 6, open on a first end face of the body itself, such cavity having a bottom surface and a peripheral or circumferential surface, respectively indicated with 17b and 17c in FIGS. 4 and 8. Defined between the bottom surface 17b and at least part of the second end face of the body of the sensitive component, observable in FIG. 5, is defined a membrane, indicated with 17e only in FIG. 5, provided with at least one detection element, schematically represented by a dashed line only in FIG. 5, where it is indicated with 18. Preferably the detection element 18 is made or fixed on the side of the membrane 17e outside the cavity 17a. The detection element 18 may be represented by a resistor or piezo-resistive element preferably thin (film, such as a thick film or a thin film) or, more generally, by any electric or electronic component capable of generating a signal representing a deformation or flexure of the membrane 17e. The sensor 17 or the body 17' may also be made of several elements associated together, for example at least one substantially tubular element and defining at least part of the cavity, associated to which is an element defining a membrane, configured as assembled part (for example glued) to said substantially tubular element.

FIG. 5 also shows how terminals 19 project from the second end face of the body 17' of the sensor 17 for the electrical connection of the sensor itself to a circuit arrangement including an electric circuit or printed circuit board and an external connector, described hereinafter.

As observable in FIG. 8, in the assembled condition of the device 1, the part 7—in which the conduit section 14b is extended—projects into the cavity of the pressure sensor 17, with the gasket made of elastic material 8 providing a radial seal between the external surface of the same part 7 and the peripheral surface of the cavity of the sensor 17.

Figure 4:
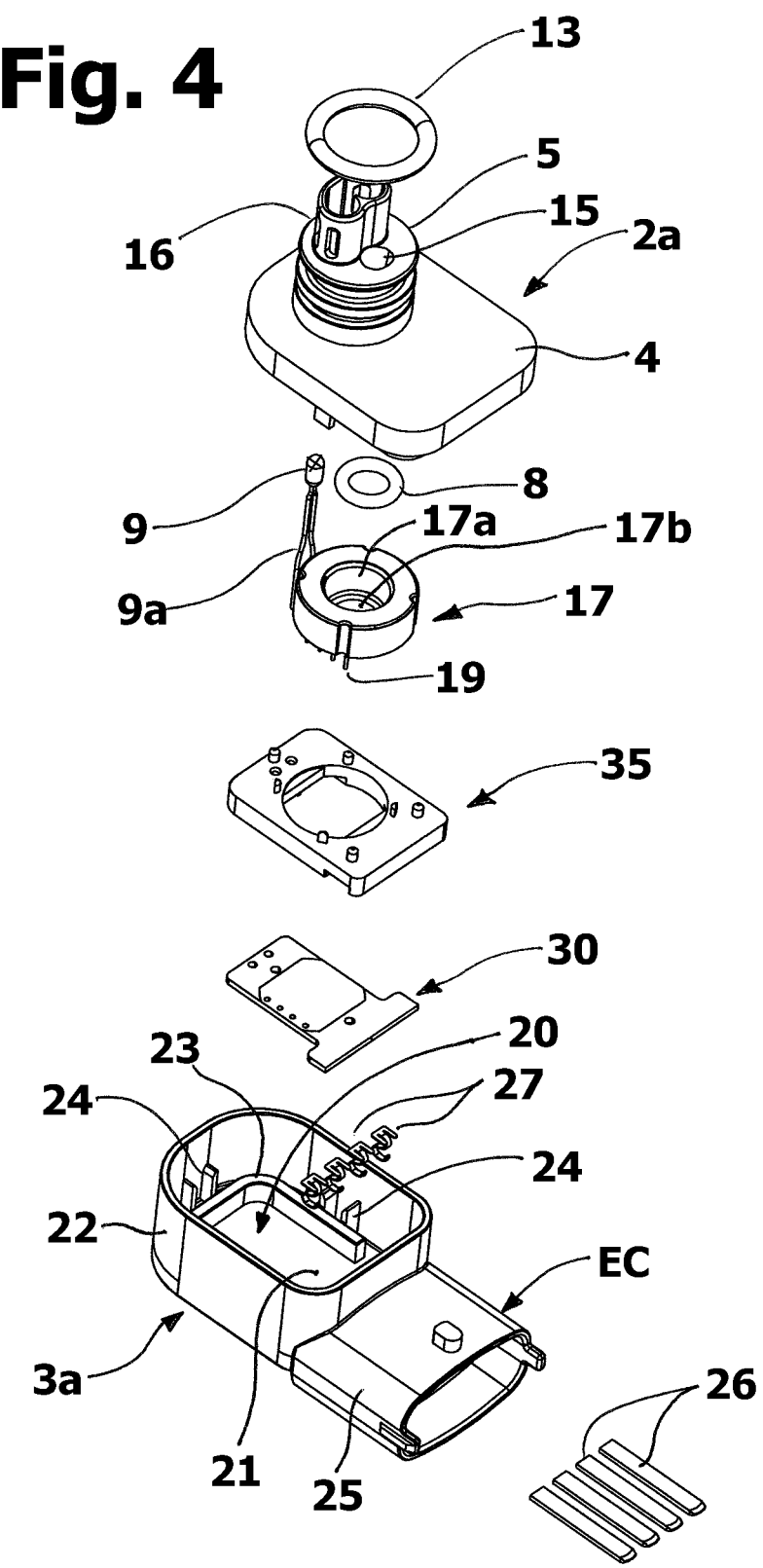

As shown in FIGS. 4 and 6 the body 3a of the electrical connection part has a hollow portion or cavity 20, delimited by a bottom wall 21 and a peripheral wall 22, the edge of the latter being configured to be coupled in the seat 12 defined in the body part 2a (see FIG. 5). Rising orthogonally from the bottom wall 21 is a support wall 23 and defined on the peripheral wall 22 is at least one axial guide 24.

The device has a connector, indicated in its entirety with EC, including a tubular part 25 of the body 3a, substantially radial or perpendicular with respect to the cavity 20, at least partially extended into which are terminals for the electrical connection of the device 1, some of which are indicated with 26 in FIGS. 3-9, made of electrically conductive material, for example a metal, such as copper, or an alloy.

In the illustrated non-limiting example the material that forms the body 3a is a synthetic material, particularly a thermoplastic material, which is overmoulded to the terminals 26, the latter for example being obtained through a blanking process from a metal strip and/or deformation or pressing process and/or mechanical machining or turning process. As observable in FIG. 7, the overmoulding is performed such that a first end portion of the terminals 26, substantially straight or rectilinear herein, is extended into the tubular part 25, to form an electric connector EC therewith. The opposite end portion of the terminals 26 is instead extended into the cavity 20, so as to obtain an electric contact, such as a support for flexible contact elements 27, made using electrically conductive material, for example a metal, such as copper, or an alloy. In an alternative solution, the terminals 26 are fixed with interference into respective through seats obtained in the wall that separates the inside of the cavity 20 with the inside of the tubular portion 25.

In the exemplified embodiment the terminals 26 are generally flat-shaped and the contact elements 27, clearly observable in FIG. 10, each have a substantially flat base part 27a, rising from which is a curved portion 27b generally S-shaped which serves as a spring, or it is elastically flexible or deformable, whose top part 27c is intended to abut against a respective flat terminal 26, preferably with a given compression, with the aim of obtaining a good electrical contact; advantageously provided for may be a welding of at least one of the ends of the contact elements 27, preferably at least the end 27a. In an alternative solution represented in FIG. 11 the spring part 27b of the elements 27 may be substantially C-shaped, without prejudice to its functionalities. The contact elements 27 are obtainable through a blanking process from a metal sheet and subsequent shaping and/or deformation or punching, according to per se known techniques. The terminals 26 are preferably distinguished by a substantially flat shape or suitably shaped, at least in the region intended for electric coupling with the elements 27. In a possible embodiment, at least part of the casing 2a, 3a of the device 1, made of electrically insulating material, may comprise reference and/or positioning means (for example in form of appendages or seats) also for the elements 27.

Indicated with 30 in FIGS. 3-9, is the previously mentioned electronic circuit or printed circuit board. As observable in FIGS. 5 and 6 the circuit 30 comprises a circuit support or board 31 made of electrically insulating material, such as ceramic or fibreglass material, provided with electrically conductive tracks 32.

In the illustrated example the circuit also includes electronic components, one of which is indicated with 33, for example for amplifying and/or treating and/or processing and/or conditioning the signals detected by the pressure sensor 17. The pressure sensor used in the various embodiments described herein and/or the respective circuit 30 is preferably configured in order to allow setting the operation and/or detection parameters, preferably comprising for such purpose memory means and/or processing means. In other embodiments, the board 31 may be without electronic components, in which case the circuit 30 only serves for electrical connection, through the surface tracks 32, between the sensor means of the device and the terminals 26 of the connector EC. The circuit architecture or layout, the electric and/or electronic components possibly present and the possible control logic provided for the circuit 30 may be of any type of the type per se known in the field, and thus not described herein.

As clearly observable in FIG. 5, some conductive tracks 32 on the surface of the support have, at a respective end, a pad 32a at which the base part 27a of a respective flexible contact element 27 (see FIG. 10 or 11) is intended to be electrically connected, preferably fixed mechanically (for example by fitting or riveting or crimping) and/or through welding.

Some tracks 32 end, at a respective end, at first connection holes 32b made as through holes in the board 31, and other tracks 32 end at second holes 32c made as through holes in the same board; at the holes 32b and 32c the tracks in question may be pad, ring or sleeve shaped, so as to surround the holes themselves. The holes 32b and 32c are provided for the connection, through coupling and/or welding, of the terminals 19 of the pressure sensor 17 and of the rheophores 9a of the temperature sensor 9, respectively. Also made in the board 31, preferably in positions not occupied by conductive tracks 32, are positioning through holes 32d.

In FIGS. 3-9 indicated in its entirety with 35 is a positioning and/or support member, or spacer, preferably made of plastic material, preferably thermoplastic, or metal material. In the illustrated embodiment, the body of the support member 35 is substantially parallelepiped or quadrangular-shaped or, generally, having a peripheral profile comprising at least two substantially rectilinear walls or faces; the body the support member 35 may also have different shapes, even more complex that the exemplified ones.

The body of the member 35 is preferably generally thin and at least having a plan overall dimension (length and/or width) greater with respect to the circuit 30 and/or to the sensor 17. With special reference to FIGS. 5 and 6, the member 35, hereinafter referred to as support or spacer for the sake of simplification, has, on a face 35a thereof, first projections or pins, indicated with 36 in FIG. 5, intended to be coupled with perimeter seats (one indicated with 17f in FIGS. 5, 6 and 8) of the sensor 17, in particular with the aim of obtaining a polarisation, or an accurate mutual coupling, or mutual positioning references.

In the example, the first pins 36 have a substantially semicircular section, or a shape preferably such that the pins 36 are held in the perimeter or overall dimension of the sensor 17, but the shape thereof may obviously be different from the represented one, preferably having a shape at least partially complementary to that of the seats 17f of the sensor 17. Defined on the same face 35a of the support 35 are second projections or pins 37, herein having substantially circular sections, which are intended to be inserted into the seats 4c of the body 2a (FIG. 5), in particular with the aim of obtaining a respective coupling in predefined position, or adapted to obtain a polarisation between the support 35 and the body 2a. The support 35 has a central passage 38 which, on the part thereof that opens on the face 35a, has a circular shape, having a diameter preferably smaller with respect to the end or head of the sensor 17, in which the membrane 17e of FIG. 5 is formed.

The opposite face 35b of the support 35 (FIG. 5) defines a seat 39, preferably recessed, for positioning and/or accommodating at least part of the board 31 of the circuit 30; preferably the seat 39 has a shape at least partially complementary to that of the board or circuit 31, though with a tolerance such to allow the mounting of the board into the seat. In the example, the terminal board 31 is generally T-shaped and the seat 39 is formed by two seat portions, indicated with 39a and 39b, substantially opposite and partially orthogonal with respect to each other.

Rising from the bottom surface of the seat 39, and particularly from the bottom surface of each of the seat portions 39a and 39b, is a respective projection or pin 40, which is intended to engage a respective hole 32d of the board 31, with the aim of positioning the circuit 30 to the support 35; the circuit 30 may be possibly fixed onto the support 35, for example through a mechanical or hot deformation of at least one end part of the pins 40, in such a manner to create a widening or fixing head. The support 35 is passed through, between the faces 35a and 35b, alongside by the passage 38, also by two small holes 41, for passage of the rheophores 9a of the temperature sensor 9.

In the assembled condition of the device the board 31 is inside the seat of the support 35: as observable, for example in FIG. 7 or 9, the depth of the seat 39a, 39b of the support is preferably greater or substantially equal with respect to the thickness of the board of the circuit 30. The flexible contact elements 27 are located on the circuit 30 on the opposite side with respect to the support 35 (see FIG. 7); and the pins 37 and 40 of the support 35 are inserted, respectively, in the seats 4c of the body 2a and in the holes 32d of the board of the circuit 30 (see FIG. 9). The rheophores 9a of the temperature sensor 9 have a section passing through in the holes 41 of the support 35 and an end engaged, preferably through welding, in the holes 32c of the electric tracks 32 of the circuit 30 (see FIG. 7).

The terminals 19 of the pressure sensor 17 instead have a section passing through in the central passage 38 of the support 35 and have an end engaged, preferably by welding, in the holes 32b of the electric tracks 32 of the circuit 30 (see FIG. 7). The membrane 17e of the sensor 17 faces the passage 38 of the support 35, in such a manner that the body of the support does not hinder the possibility of deformation of the membrane portion. The pins 36 of the support 35 cooperate with the peripheral seats 17f (see FIG. 8) of the sensor 17, thus also guaranteeing the correct angular positioning of the sensor itself with respect to the support 35. The sensor 17 is inserted into the chamber 6 of the body 2a (see FIG. 9), with the gasket 8 providing radial sealing on the internal cylindrical surface of the sensor. In the assembly, the rheophores 9a of the temperature sensor 9 are first inserted into the holes 4d of the body 2a, then into the holes 41 of the support 35 and lastly into the holes 32c of the terminal board 31 (for reference see FIG. 5), before finally being welded to the respective tracks 32. Depending on the application, such as use with a liquid, provided for at the holes 4*d* may be a suitable seal material, such as a synthetic resin, or provided for may be suitable seal elements, such as gaskets.

The body 2*a* is coupled to the body 3*a* in such a manner that the projections 4*e* of the former (FIG. 5) are engaged in the linear guides 24 (FIG. 6) of the latter, and with the edge of the peripheral wall 22 of the body 3*a* (FIG. 6) fitting or coupling into the seat 12 of the body 2*a* (FIG. 5). After this coupling, facing into the cavity 20 of the body 3*a* (FIG. 6) are the support 35 and the circuit 30, and the wall 23 and/or another portion of the body 3*a* present in the hollow portion 20 peripherally presses the support 35 onto the body 2*a* to maintain it in position (see FIG. 9). The support 35 may also be fixed or welded to the body 2*a* (for example through laser, vibration, hot welding, or through mechanical deformation of a part or appendages of the body), in such a manner not to require the wall 23, or the wall 23 could press onto the circuit 30.

After this coupling, the ends 27*c* (see for example FIG. 7) of the flexible contact elements 27 are at contact with the end portion of the terminals 26 that projects into the cavity 20, in a condition of electrical contact through at least partial elastic compression of the elements 27. The coupling between the bodies 2*a* and 3*a* may then be obtained by welding the two bodies together (laser welding or hot remelting welding of part of the bodies or vibration welding or ultrasound welding, etcetera), or by applying an adhesive and sealing material between the two bodies, or by mechanically deforming one of the two bodies (preferably when made of metal material) with respect to the other with possible interposition of a gasket, etcetera. Coupling techniques of this type are useable in all the inventive embodiments described herein.

Under normal conditions of use the device 1 is hydraulically connected to a line of the fluid subjected to control, through the connection portion 5 fitted, for example, into a pipe of the fluid in question. In this manner, also the temperature sensor 9 is exposed to the fluid, which fills the pipe 14*a*-14*b* facing the membrane of the pressure sensor 17 (see for example FIG. 9). A signal or resistance value representing the temperature of the fluid is generated to the rheophores 9*a* of the sensor 9.

The pressure of the fluid stresses the membrane of the sensor 17, causing flexure thereof corresponding to a deformation of the detection element 18 of FIG. 5, and thus the resistive characteristics or resistance values thereof: in this manner, a signal representing the pressure value of the fluid is generated at the terminals 19 of the sensor 17. It should be observed that, under normal operation, the pressure of the fluid tends to push the body 17' of the sensor 17 in the direction opposite to the pressure port: regardless of the fact that the body of the sensor 17 is not rigidly connected to the casing, it cannot move in the abovementioned direction, due to the presence of the support 35, mounted between the bodies 2*a*-3*a* in fixed position: on the contrary, the membrane of the sensor is free to be deformed, given that it faces an open region of the support 35.

The signals representing the temperature and the pressure, possibly amplified and/or treated and/or processed in a per se known manner by electronic components 33 of the circuit 30, reach the terminals 26 of the device 1, which are electrically coupled to an external wiring—not represented—connected to a suitable external control unit, such as an electronic control unit of a vehicle (for example a fuel injection control unit or a nitrogen oxide emission control unit), or a control circuit of a domestic appliance or a control unit of an appliance or system for heating or conditioning air or fluids.

In this embodiment, just like in the other embodiments described hereinafter, the circuit 30 is extended above (with reference to the figures) the sensor 17, but at a given distance therefrom (for example at least 2-4 mm), i.e. without direct contact between the board 31 and the sensor body 17', the two components being connected through the terminals 19 of the sensor, which are preferably at least slightly flexible: any stresses exerted on a component are thus not substantially transferred to the other component. In the preferred embodiment, for this purpose, the support 35 is operatively interposed between the circuit 30 and at least the sensor 17, advantageously serving as a separator and/or spacer element as well as for accommodating and/or positioning between the parts in question. Alongside maintaining the circuit 30 and at least the sensor separated and positioned with respect to each other 17, the support 35 confers to the assembly formed at least by the circuit 30 and the sensor 17 a considerable mechanical sturdiness, allowing safe manipulation thereof through simple and inexpensive automated equipment. Additionally, the support 35 also prevents the board 31 from being connected or supported directly by the casing of the device 1; also the board 31 is thus maintained at a given distance from the walls that delimit the chamber 20.

Alternatively to the support 35 configured as a distinct part with respect to the casing, one or both bodies 2*a*, 3*a* could be configured to at least partially serve the functions of the abovementioned support.

The fact that the support 35 has one or both plan overall dimensions greater with respect to the circuit 30 and the sensor 17 allows safely gripping the support with the aim of manipulating the abovementioned assembly, with the circuit 30 also being more protected during said manipulation; said assembly may thus be mounted on the body 2*a* through an easily automatable movement, where also the mutual positioning of the bodies 2*a* and 3*a* may occur through an easily performable movement using automatic production equipment.

The flexible contact elements 27 allow recovering any production and/or assembly tolerances of the coupled parts, or possible slight dilatations of the material the respective bodies are made of, guaranteeing a good electrical contact even in presence of said tolerances or dilatations, or in case of movements generated between the casing and the sensor 17 following pressure variations (that turn into variations of the force applied to the sensor); lastly, alongside serving as electrical connection members, the elements 27 could also advantageously serve to elastically press the circuit 30 onto the support 35, so as to guarantee a more accurate positioning of the parts.

It shall be observed that, according to a preferential characteristic of the invention, the sensor 17 is not rigidly coupled or fixed to the casing or to other internal parts of the device, and this characteristic contributes to reduce the measurement errors, increasing the measurement accuracy and stability over time and/or avoiding damage risks due to mechanical strains or stresses. Furthermore, according to a further preferential characteristic, also the circuit 30 is not rigidly coupled or fixed to the casing 2*a*-3*a* of the device.

As a matter of fact, in the described embodiment, the sensor 17 is elastically associated to the abovementioned casing through seal means represented by the gasket 8, interposed between the monolithic body of the sensor 17 and the body 2*a*; the spacer support 35 is provided for on the opposite part, between the body 17' of the sensor and part 3*a* (and part 2*a*). The circuit 30 is instead borne on the spacer support 35, i.e. its is associated to a distinct component with respect to the casing or structure 2*a*-3*a*. Furthermore, the circuit 30 may not be fixed mechanically to the spacer support 35, with the pins 40 solely serving as positioning and/or polarising elements: in such embodiment, the circuit 30 is elastically mounted with respect to the casing 2a-3a through flexible contacts 27, interposed between the circuit itself and the body 3a (in particular between the circuit and the terminals 26 integrated in the body 3a); the spacer support 35 is provided for on the opposite part, between the circuit 30 and the body 2a, in a fixed position with respect to the structure.

The presence of the gasket 8 allows isolating the active elements of the sensor 17 from the casing, and in such manner any possible mechanical stresses applied to the casing are not transmitted to said active elements, and in particular to the measuring membrane; also the preferred presence of the support 35 and/or the flexible contact elements 27 contributes to render the operations of assembling the device 1 less critical, and thus simpler, and reduce or eliminate the risk that external stresses or mechanical stresses exerted on the body 2a and/or 3a be transmitted to the circuit 30; the presence of a slight clearance or mounting tolerance between the board of the circuit 30 and the respective seat 39 defined in the support 35a is also advantageous for such purpose.

Illustrated in FIGS. 12-16 is another embodiment of a pressure sensor device according to the invention. In such figures, the same reference numbers of FIGS. 1-11 are used to indicate elements technically equivalent to those described and illustrated previously.

The device 1 of FIGS. 12-16 is not provided with a temperature sensor, and the bodies 2a and 3a are shaped differently with respect to the previous embodiment, still serving the same purpose as the base. Furthermore, in this embodiment, the geometries of the circuit 30 and of the respective support 35 are slightly different.

Also in this solution the body 2a has a support portion 4, with respective central part 4a defining a cavity or chamber 6 for accommodating the pressure sensor 17, and a hydraulic connection portion 5 or "pressure port". The portion 5 is axially passed through by a conduit having a first and a second section 14a and 14b coaxial with respect to each other. As observable in FIG. 16, the conduit section 14b, having a restricted section, is partially extended into an appendage 7b defined at the upper end of the tubular part 7 that rises from the bottom of the chamber 6.

The sensor 17 has a configuration similar to that already described previously. The circuit 30 has reduced dimension with respect to the previous case, and its board 31 has a substantially flat parallelepiped shape. The support 35 has a thin and flat configuration, substantially circular or semicircular.

Figure 15:
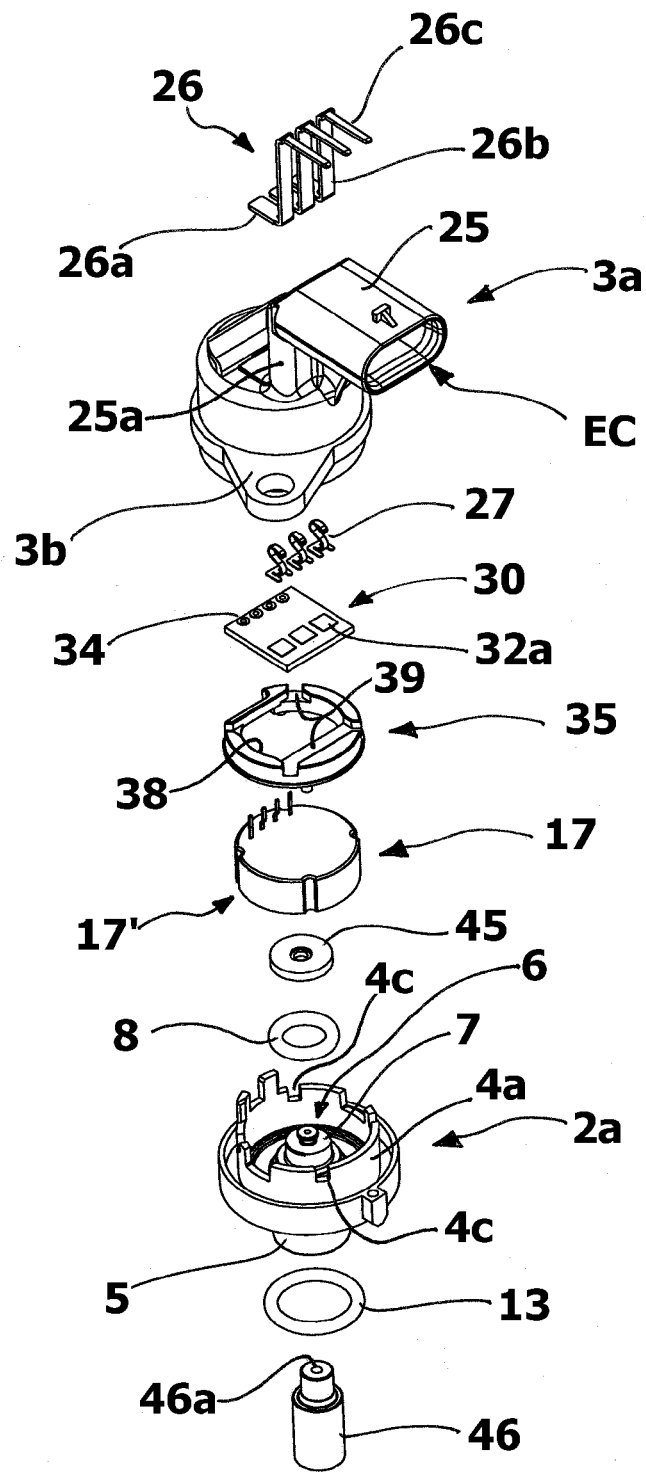

In this case the support 35 has only one recessed seat for the circuit 30, indicated with 39 in FIG. 15, and it does not have the positioning pins 40 of the previous embodiment (FIG. 5): consequently, the board of the circuit 30 is not provided with the through holes 32d either. The support 35 has pins 36 (FIG. 14) intended to cooperate with respective perimeter seats 17f of the sensor 17. Furthermore, the wall 12 of the body 2a preferably has seats 4c, for accommodating at least one portion of the pins 37: thus, in an embodiment, the elements (36) of the support 35 provided for the positioning of the sensor 17 are also used for positioning the support 35 with respect to a part of the casing of the device (the body 2a herein).

Preferably, the mainly circular profile of the support 35 has a bevel, or a substantially flat peripheral surface or face, adapted to allow positioning without the possibility of rotating the support itself inside the cylindrical wall 4a of the body 2a (FIG. 15).

In an embodiment the body 3a has at least one fixing flange, or radial fixing appendages 3b, and the tubular part 25 of the connector EC is connected to the main part of the body 3a through a massive or solid portion of the body, indicated with 25' in the figures.

In an embodiment (see for example FIG. 16), the body 3a is made of thermoplastic material that is overmoulded to the terminals 26. The terminals 26, observable for example in FIGS. 14-15 have in this case two intermediate folds, hence defining a flat-shaped base part 26a to cooperate with the flexible contact elements 27 welded to the pads 32a of the circuit 30; the base part 26a of the terminals is followed, preferably at a right angle, by an intermediate part 26b, also flat, and lastly by an end part 26c, also generally flat-shaped but with restricted width, which follows—preferably at a right angle—the intermediate part 26b; this end part 26c is intended to be extended, in the assembled condition, into the tubular portion 25 of the body 3a, as observable for example in FIG. 16, to obtain the electric connector EC.

In an embodiment the body 3a has, in its external part, a sort of transverse channelling 3c, defined by a substantially dome-shaped wall, open at least one end; in the non-limiting example, the channelling 3c is thus obtained by a sort of cap, at least partially arched and having an elongated shape, projecting outside the wall 21, in a position relatively spaced from the electric connector EC, and open at both ends.

Figure 16:
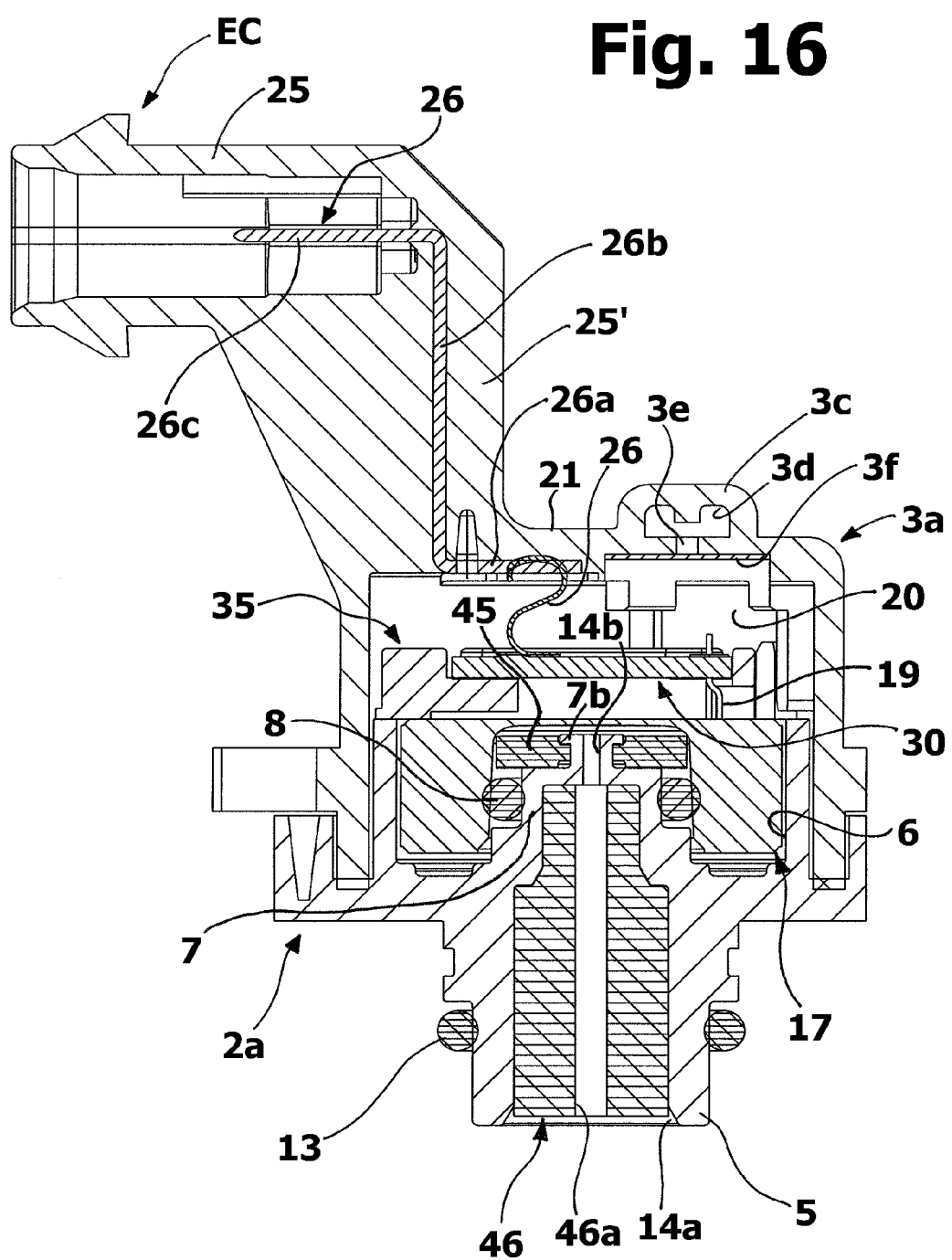
FIG. 16 is a transverse sectional view of the device of FIGS. 12 and 13, in an enlarged scale.

The internal passage 3d of this channelling 3c is in communication—through at least one gap or passage 3e, preferably orthogonal to the channelling 3d, observable in FIG. 16—with the inside of the device 1, and specifically with the hollow region 20 of the body 3a. The channelling 3c and the passage 3e allow communicating the inside of the device 1 with the external environment, for ventilation purposes and/or for providing reference environmental pressure. If required, such functionality is obtainable in the device of FIGS. 1-11, by holes or passages present in the body 3a, not shown (it should be observed that the pressure sensors useable in the various versions of the device described herein may be of the absolute type or of the differential type, and in this second case the casing is provided with at least one passage suitable to provide the reference environmental pressure).

The abovementioned dome-shaped wall which defines the channelling 3d and which overlies the gap 3e, provides a protection means for such ventilation gap, obtaining a sort of uneven path that prevents the risk of dirt finding its way directly into the gap; preferably the channelling 3c has a larger passage section with respect to the section of the gap or gaps 3e, so as to facilitate the flow of air. In an embodiment, provided for inside the body 3a may be further protection means, such as a membrane 3f mounted at the gap 3e (for example glued), adapted to prevent the entry of moisture into the device 1; the membrane 3f is conveniently of the porous type, permeable to air but not moisture, for example made of GoreTex® material.

The bodies 2a and 3a may be advantageously made of material suitable to allow laser welding, with the aim of mutual welding between the bodies themselves. For example, the bodies 2a and 3a may be made using material transparent and opaque to the welding laser beam, respectively, or vice versa; in such manner, upon impact from the laser beam, the material of the opaque body, for example the body 3a, is heated locally, until it melts and thus welds against the material of the transparent body, for example the body 2a, passed through by the beam without being heated. Obviously such technique may also be used in other embodiments of the device described herein, as well as for fixing different parts of the device together (for example the support 35 and the body 2a), or for welding in different manners, for example in the joint region of both opaque materials. In a further possible embodiment the bodies 2a and 3a may be made of materials and shapes adapted to allow welding through hot remelting or through ultrasound or vibration welding.

The solution of FIGS. 12-16 allows obtaining the same advantages, in terms of production simplicity, highlighted with reference to the embodiment of FIGS. 1-11.

In the embodiment of FIGS. 12-16, just like in the other embodiments described herein, the device 1 may be further provided with means intended to compensate possible peaks or temporary pressure increases of the fluid subject to measurement, or adapted to compensate some internal mechanical stresses for example due to the freezing of the fluid itself.

With particular reference to FIG. 16, mounted at the top of the tubular part 7 that projects into the cavity of the pressure sensor 17 is a compensation element, indicated with 45, of predefined shape. Such element 45 has a compressible body, in such a manner to be able to compensate said possible increases of volume of the fluid subject to detection, in case of freezing of the latter and/or following temporary sudden pressure changes or peaks. The compressible or compensation element 45 is generally tubular-cylindrical and flattened, substantially washer-like, with a central through hole wherein the previously mentioned end appendage 7b of the tubular part 7 is fitted. Also the appendage 7b is tubular, being passed through by the conduit section 14b, intended to supply the fluid to the cavity of the sensor 17. The upper end of the appendage 7b is substantially flange-shaped, so as to maintain the compensation element 45 in the operative position. The appendage 7b could also be absent, with the compensation element 45 fixed in another manner at the top of the tubular part 7, for example glued, welded or overmoulded. In the exemplified embodiment, the device 1 also comprises a second compensation element, generally made and operating in a manner similar to that of the element 45. Such second compensation element, indicated with 46, is accommodated in the conduit section 14a. The second compensation element 46 is generally cylindrical-shaped, with two axial portions having different external diameter and with an internal passage 46a axially aligned to the conduit section 14b made in the appendage 7b, in such a manner to define a respective part of the conduit that supplies the fluid subject to measurement to the cavity of the sensor 17; preferably, the passage 46a has a larger cross section with respect to the conduit section 14b.

Furthermore, in the illustrated preferred embodiment, provision for a minimal passage section, determined by the conduit section 14b, serves to determine the preferential region of the beginning of the fluid freezing. Thus, in practice, is at the pipe section 14b—that substantially provides a capillary passage—that shall initially tend to form a sort of "ice cap", and the freezing of the fluid shall then continue in the part of the conduit having a larger diameter, represented herein by the passage 46a of the element 46. Obviously the freezing and the ensuing increase of volume in the element 46a is compensated due to the compression capacity of the element 46.

Figure 17:
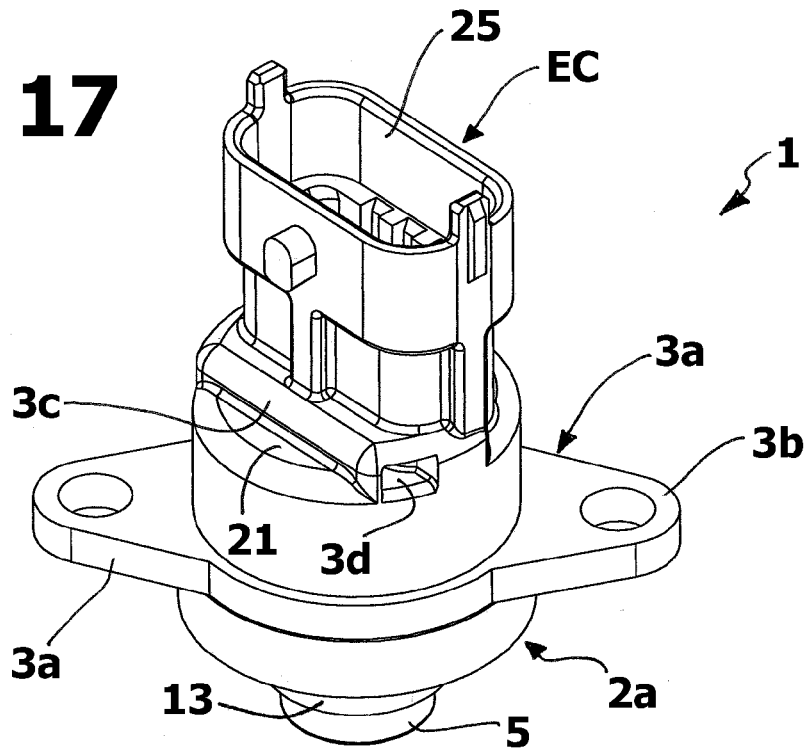
FIGS. 17 and 18 are perspective views, from different angles, of a pressure sensor device according to a third inventive embodiment.
Figure 18:
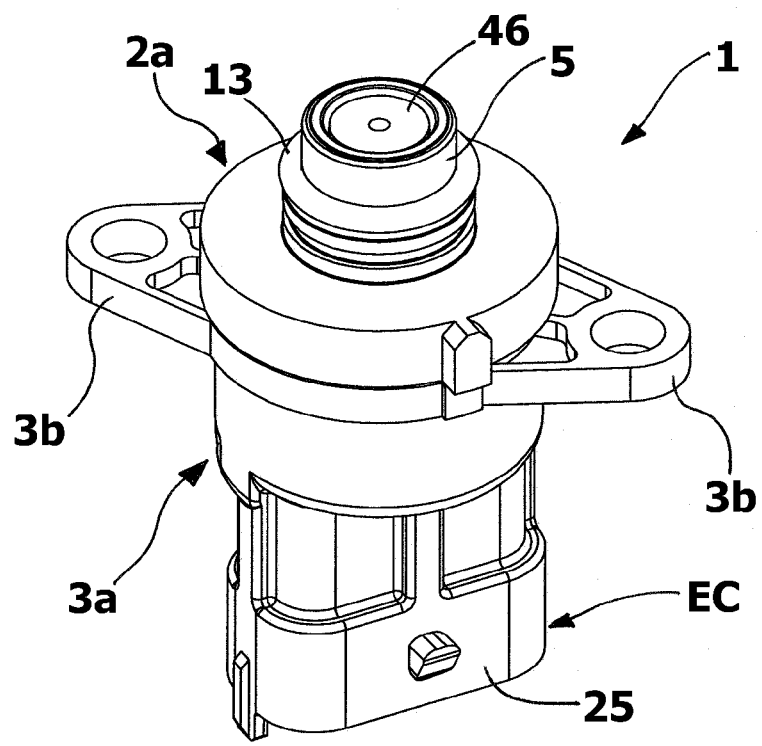
Figure 19:
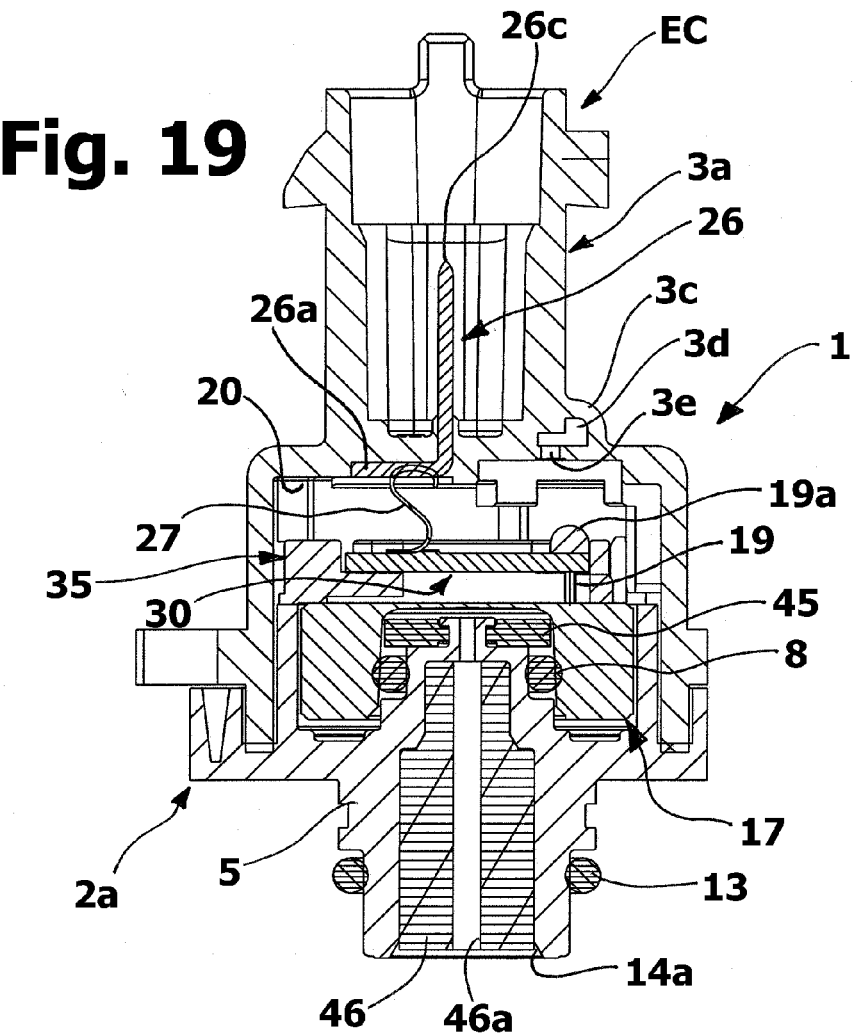
FIG. 19 is a transverse sectional view of the device of FIGS. 17 and 18, in an enlarged scale.

FIGS. 17-19 show a further embodiment of a pressure sensor device. Also in these figures the same reference numbers of the previous figures are used to indicate elements technically equivalent to the ones described and illustrated.

The general configuration of the device of FIGS. 17-19 is for the most part similar to that of the device of FIGS. 12-16, but with a different arrangement of the tubular portion 25 of the body 3a, that forms part of the connector EC for the electrical connection of the device 1. In an embodiment, the abovementioned tubular portion is extended in axial direction directly from the bottom wall of the body 3a that defines the bottom of the cavity 20, and the ventilation channelling 3c is obtained adjacent to the tubular portion 25 of the connector EC. The porous membrane 3f at the gap 3e is not shown in FIG. 19, but obviously the membrane may be provided for also in this case.

Also the terminals 26 are shaped differently with respect to the previous embodiment, being substantially L-shaped, with a flat base part 26a intended to cooperate with the respective flexible contact element 27; such base part 26a is followed orthogonally by the end part 26c, which is extended up to the inside of the tubular portion 25, thus obtaining the electric connector EC therewith.

Through this embodiment, the body 3a may be overmoulded to the terminals 26 or the terminals 26 may be fitted into respective seats of a body 3a moulded separately without distinction; preferably further provided for may be a seal for the terminals, for example by means of a resin, or through seal elements obtained through special thermoplastic materials having both the characteristic of guaranteeing an ideal adhesion to metal (in such a manner to allow high watertight seal), and the characteristic of adhering or co-melting with the material made through co-moulding of the tubular portion 25 of the body 3a, in such a manner to guarantee total impermeability against penetration of external fluids along the terminals 26.

In an advantageous embodiment, at the welding region of the terminals 19 of the pressure sensor 17 to the circuit 30 the end of the terminals themselves is preferably covered by a protective material, indicated with 19a in FIG. 19, schematically represented in form of a drop. The material in question, for example a synthetic resin, serves to prevent possible oxidations and/or corrosions at the ends of the terminals 19. An analogous technique is also useable for the terminals or rheophores of other electric/electronic components connected to a printed circuit board of the device, such as for example the rheophores 9a of the temperature sensor of the embodiment of FIGS. 1-11.

Figure 20:
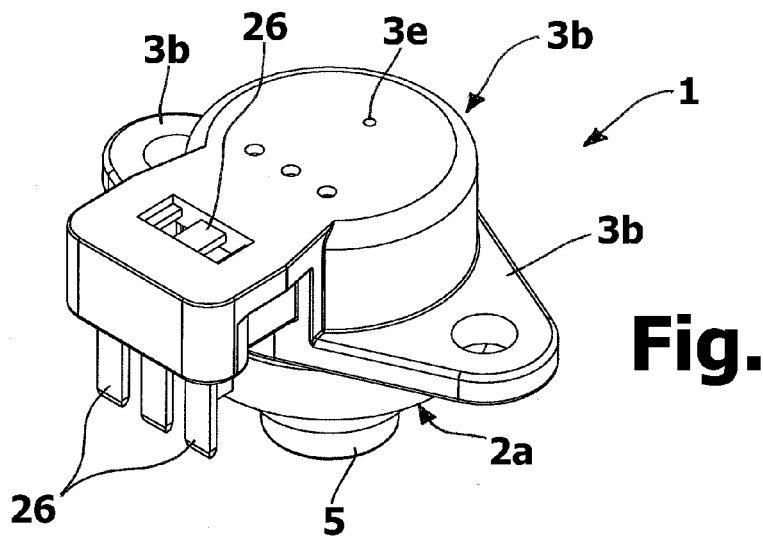
FIGS. 20 and 21 are perspective views, from different angles, of a pressure sensor device according to a fourth inventive embodiment.
Figure 21:
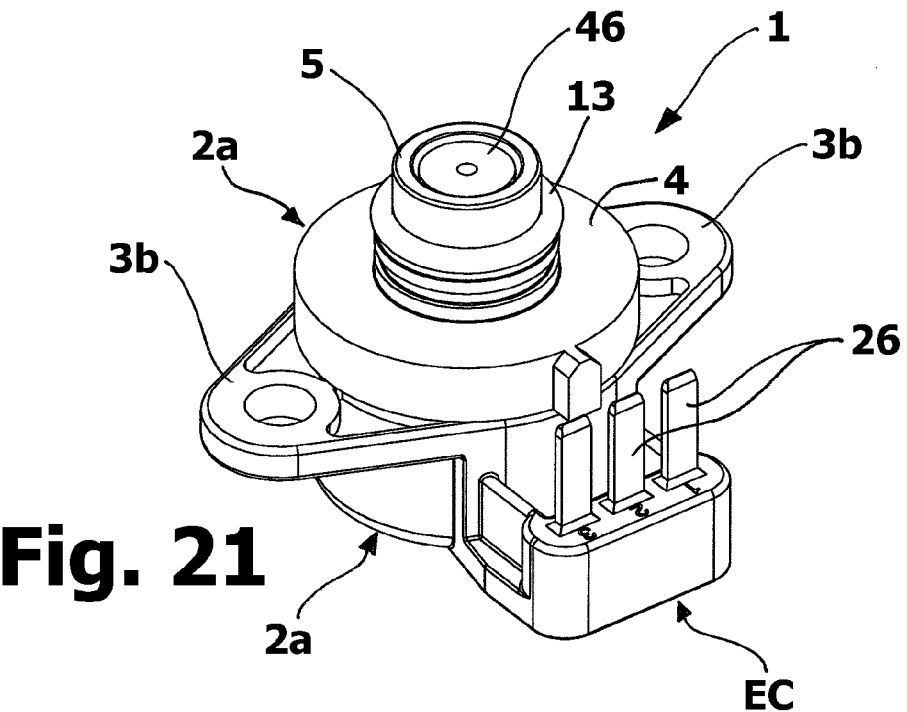
Figure 22:
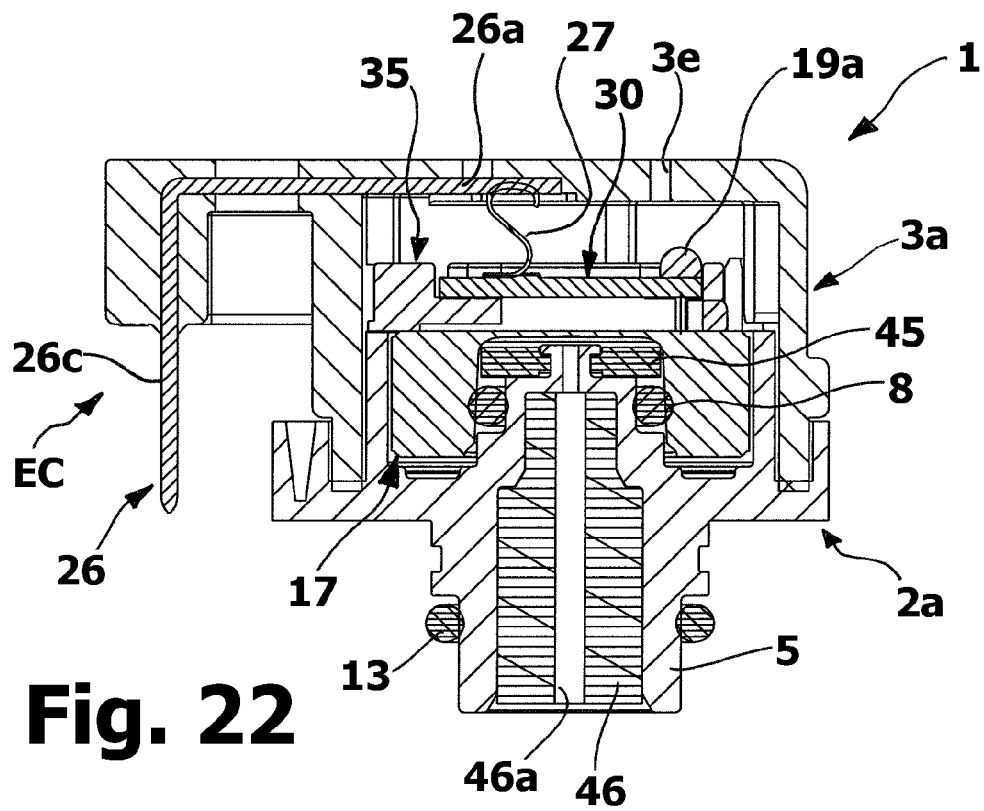
FIG. 22 is a transverse sectional view of the device of FIGS. 20 and 21, in an enlarged scale.
Figure 23:
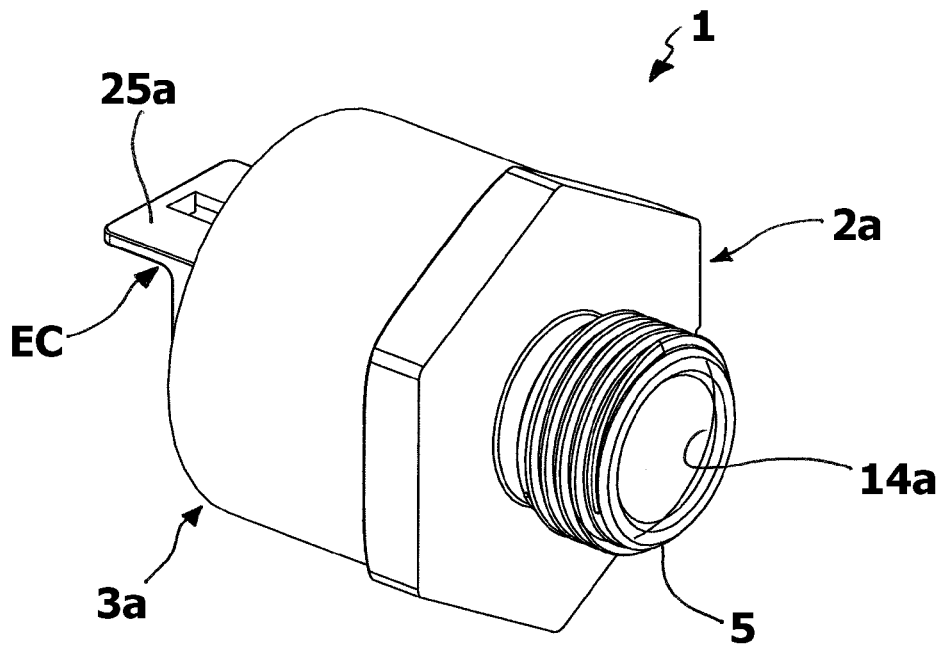
FIGS. 23 and 24 are perspective views, from different angles, of a pressure sensor device according to a fifth inventive embodiment.
Figure 24:
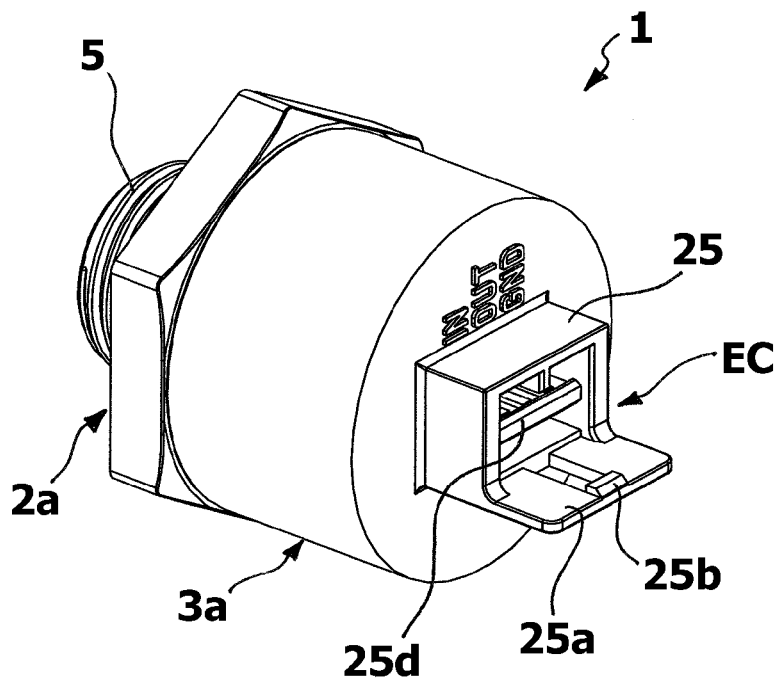

FIGS. 20-22 illustrate another embodiment, for the most part similar to that of the embodiment of FIGS. 17-19. Also in FIGS. 20-22 the same reference numbers of the previous figures are used, to indicate elements technically equivalent to those already described and illustrated.

The sensor device of FIGS. 20-22 differs from that of FIGS. 17-19 essentially due to the shape of the body 3a and of the terminals 26 and/or of the electric connector EC. Also in this case, the terminals 26 are generally L-shaped but they are arranged such that their end part 26c projects directly outside the body 3a, towards the body 2a, in a direction substantially parallel to the connection portion 5 of the body 2a and/or to the axis of the sensor 17. Thus, the tubular portion 25 of the previous embodiments is not provided for in this embodiment, i.e. the electric connector EC is not provided with such tubular portion, and the body 3a is overmoulded to the terminals 26, which still maintain a flat part 26a directly exposed inside the cavity 20 of the body 3a, in such a manner that the upper end of the contact elements 27 may elastically abut on such part. Preferably the part 26a has a section and/or width equivalent to the part 26c of the terminals 26.

The embodiments of FIGS. 17-19 and 20-22 allow obtaining the same advantages, in terms of production simplification, highlighted with reference to the embodiments of FIGS. 1-11; processes and/or materials analogous to those described in the previous examples are useable and/or combinable for such purpose.

FIGS. 23-29 illustrate a further embodiment of the invention, characterised by a particular configuration of the parts of the casing of the device and/or or its electric connector, and by a particular fixing of the support means of the printed circuit board. Also in these figures, the same reference numbers of the previous figures are used, to indicate elements technically equivalent to those already described and illustrated.

The casing of the device 1 of FIGS. 23-29 is made up of two bodies 2a and 3a, coupled together, preferably but not necessarily in a sealing manner. The body 2a has the support portion 4, defining the chamber 6 for accommodating the pressure sensor 17, and the hydraulic connection portion 5. In an embodiment the portion 5 has an external threading, which provides coupling means through screwing or angular movement; also different coupling means, preferably of the quick-coupling type, could be alternatively provided for, such as the coupling referred to as "bayonet-coupling".

Figure 25:
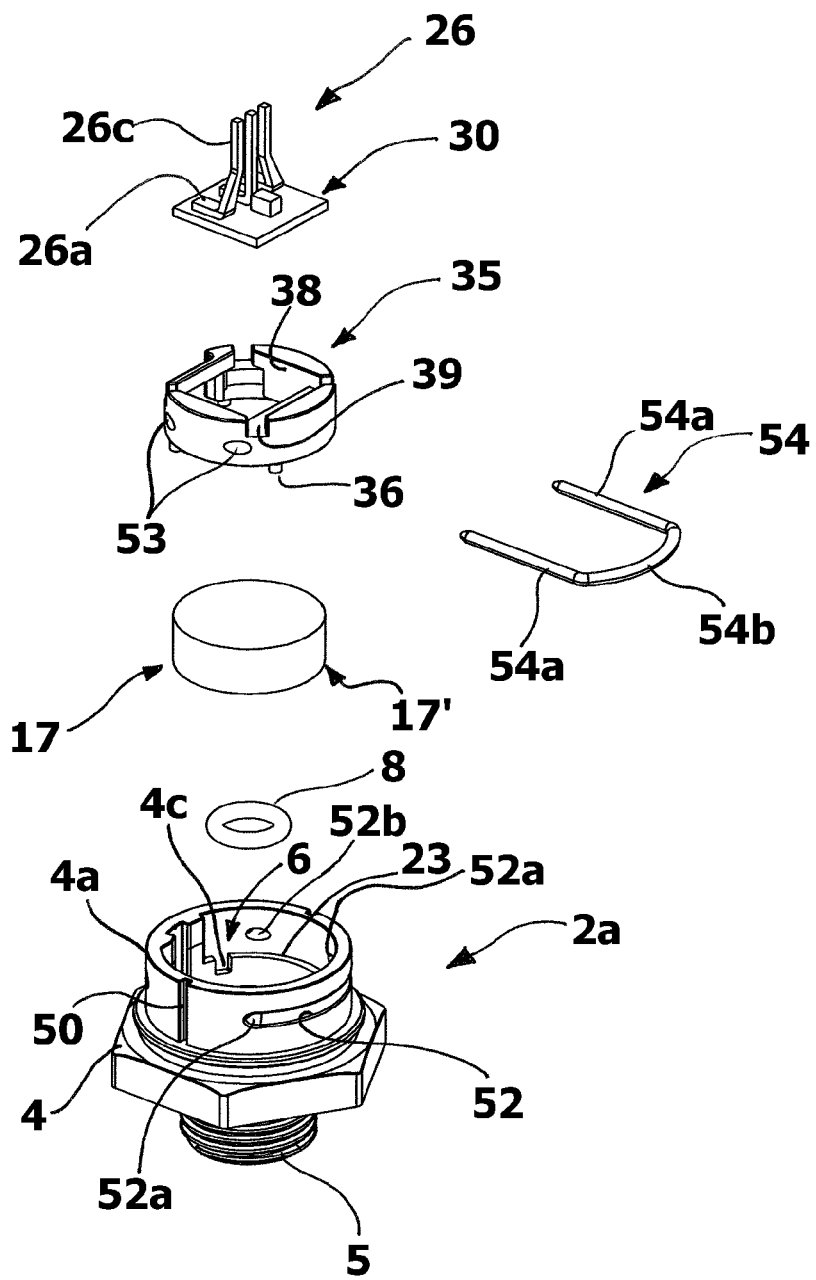
FIGS. 25 and 26 are exploded views, from different angles, of the device of FIGS. 23 and 24, in smaller scale.
Figure 26:
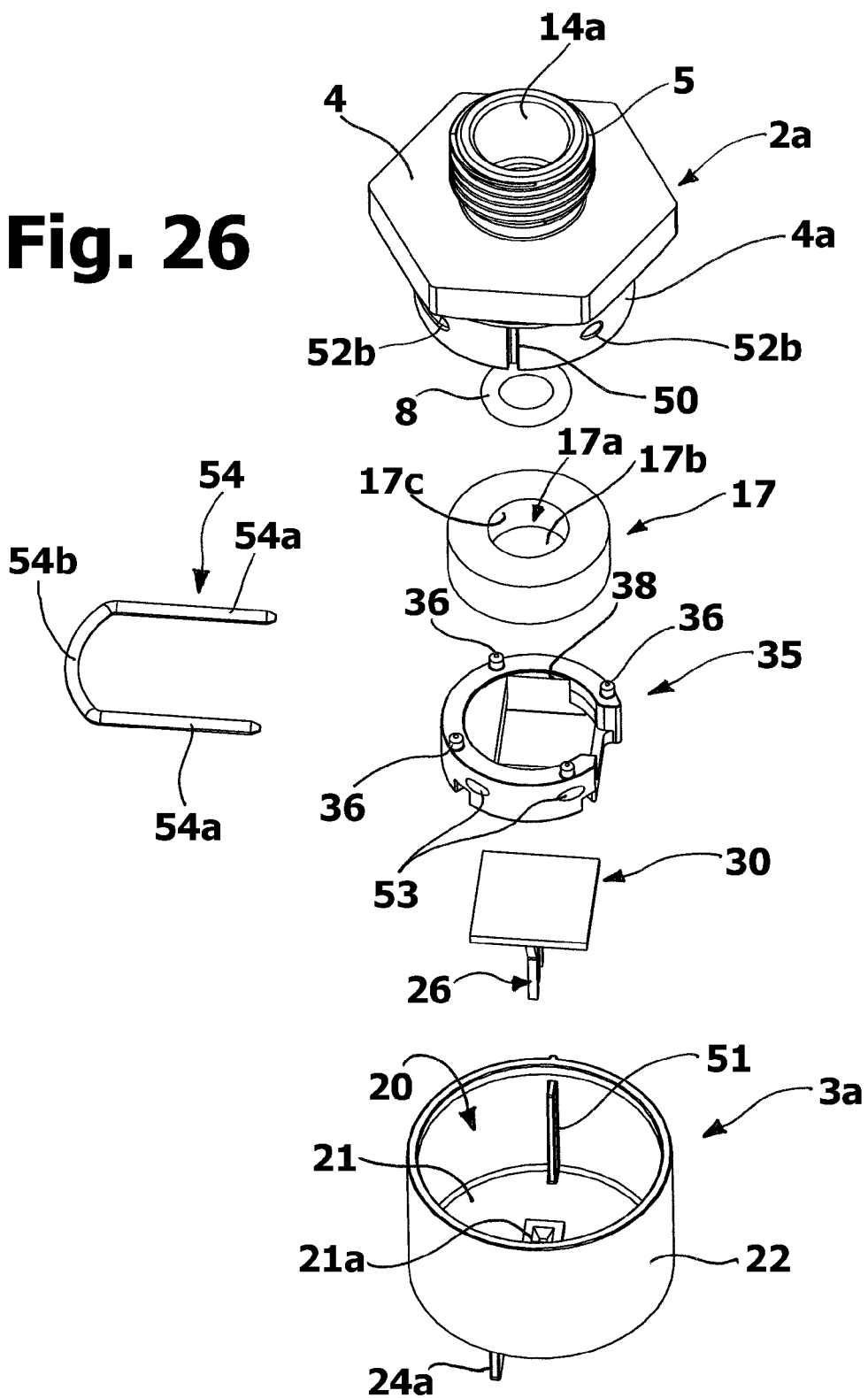

As observable particularly in FIGS. 25 and 26, the cylindrical wall 4a which delimits the chamber 6 has at least one external axial groove 50, intended to cooperate with a respective axial projection 51 of the body 3a, for the proper mutual positioning between the two bodies 2a and 3a and/or to prevent respective angular movements. Formed inside the chamber 6 is an abutment surface indicated with 23 in FIG. 25, in form of a step made in the thickness of the wall 4a, for the abutment of the support 35 of the circuit 30; also defined in such abutment surface 23 are seats, one of which is indicated with 4c, for accommodating at least one portion of the pins 37. The sensor 17 is herein represented only schematically, but it should be borne in mind that the same may be provided with the perimeter seats 17f as in the previous embodiments, adapted to cooperate with the pins 36.

Indicated with 52 in FIG. 25 is a recess or groove, formed transversely on the external part of the cylindrical wall 4a, and thus substantially circle-arc-shaped. Formed at the two ends of the groove 52 are respective through holes in the wall 4a, indicated with 52a still in FIG. 25. Analogous holes 52b (see also FIG. 26) are formed in the opposite part of the wall 4a, each axially aligned to a hole 52a.

The support 35 has a general configuration substantially similar to that of the embodiments of FIGS. 12-21. In this case, additionally, formed in the body of the support 35 are two transverse passages 53; the ends of one of the two passages being observable in FIGS. 25 and 26; both passages 53 are observable in the section of FIG. 29. The pitch between the passages 53 is substantially the same of the pairs of holes 52a and 52b of the body 2a. In another embodiment the passages 53 may be replaced by recessed or grooved seats, formed transversely on the surface of the body of the support 35. A different number of passages or seats 53 may possibly be provided for in the support 35.

The circuit 30, represented only schematically, is made similar to the previous embodiments, and thus comprising a circuit board with surface conductive tracks provided with terminal pads, at which the base parts 26a of three electrical terminals 26, substantially L-shaped are welded, as observable for example in FIG. 25.

The body 3a has a bottom wall 21 and a cylindrical wall 22 that define the cavity 20, intended to receive the part 4 of the body 2a. Passages for the respective portions 26c of the terminals 26 are present in the bottom wall 21; one of the passages is indicated with 21a in FIGS. 26 and 27. The cylindrical wall 22 has, as mentioned, at least one axial projection 51 intended to cooperate with a respective groove 50 of the body 2a. A tubular portion 25 with a quadrangular section departs from the bottom wall 21, externally with respect to the cavity 20. The tubular portion 25 has a projecting wall portion 25a, obtained in which is an engagement means, such as a seat or an engagement tooth 25b (FIG. 27-29), for coupling to an external connector, not represented.

Figure 27:
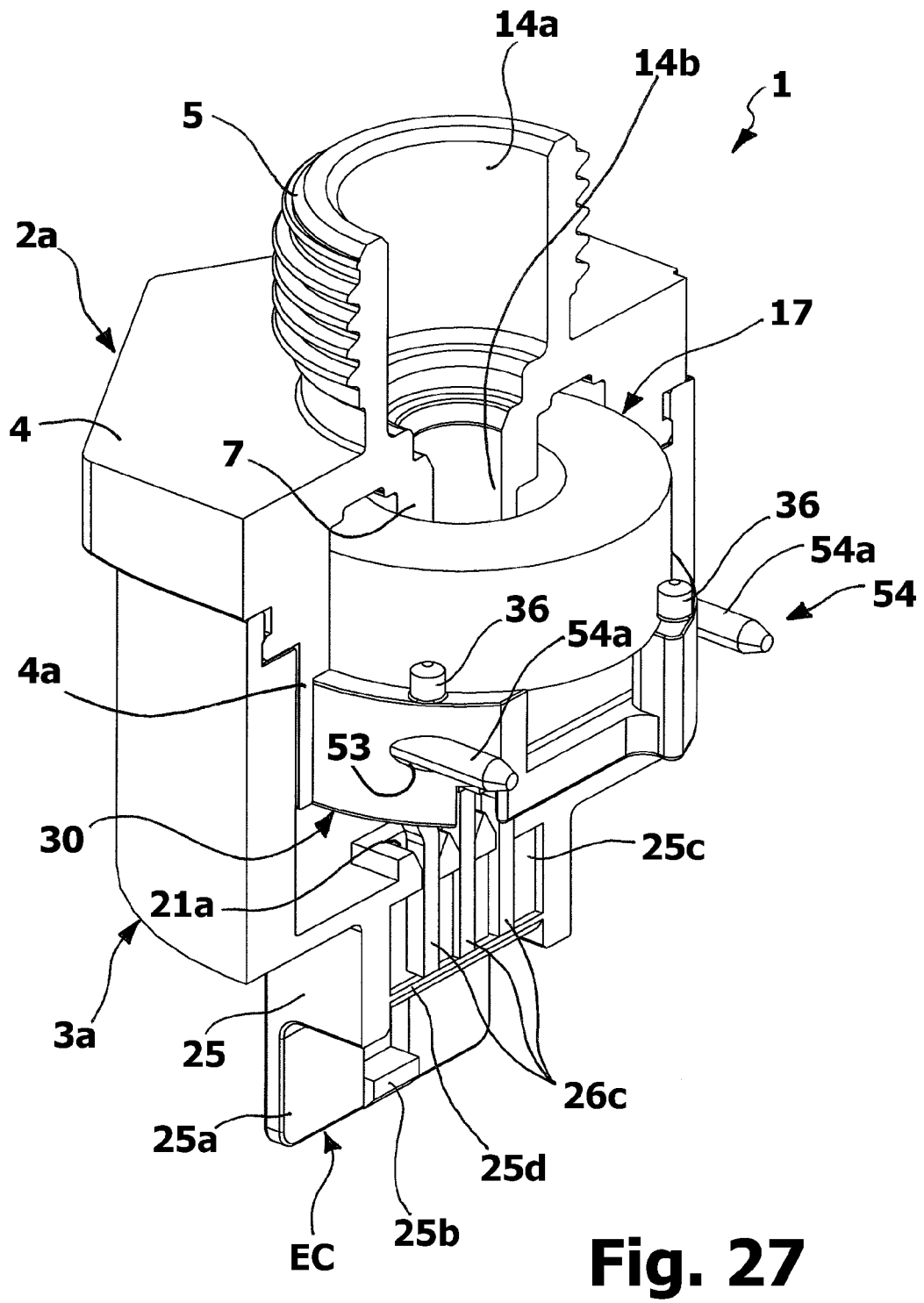
FIG. 27 is a perspective view in partial section of the device of FIGS. 23 and 24, in an enlarged scale.
Figure 28:
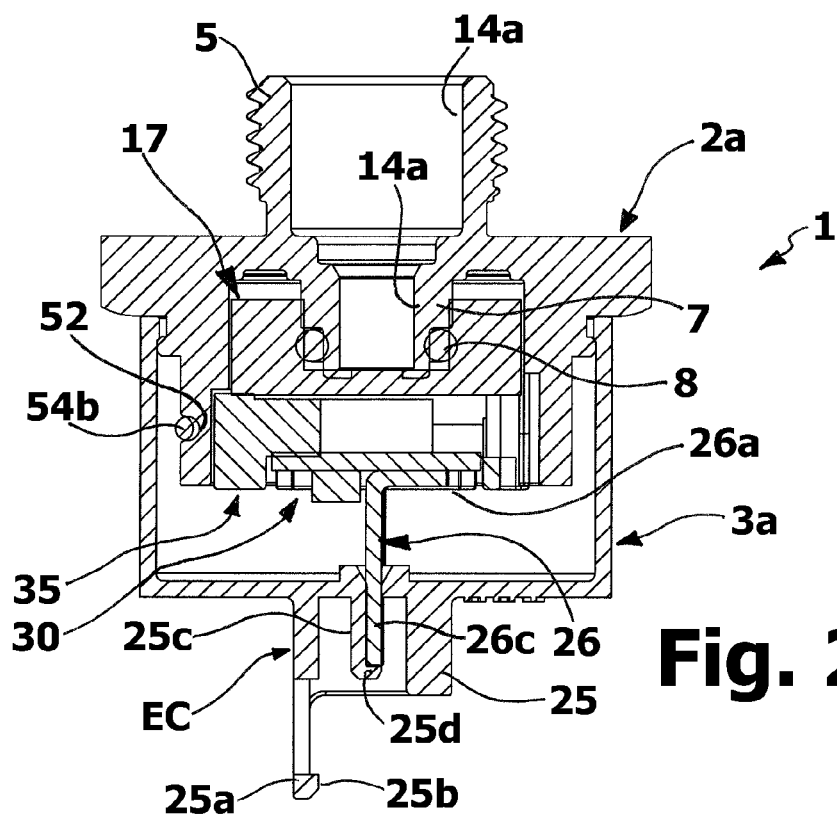
FIGS. 28 and 29 are two transverse sectional views, according to sectional planes orthogonal to each other, of the device of FIGS. 23 and 24.

An intermediate wall 25c, observable for example in FIGS. 27 and 28, which ends with a step 25d is extended into the cavity of the tubular portion 25. In the assembled configuration, the ends of portions 26c of the terminals 26, opposite to those welded on the circuit 30, abut against or close to the step 25d, with the respective upper surfaces substantially close or flushed with respect to its edge, as observable for example in FIGS. 27 and 28 (the thickness of the terminals is preferably substantially close or equivalent to the height of the step). In this manner, the connector obtained from the wall 25c with the step 25d, the portions 26c of the terminals simulates a male connector obtained from a printed circuit board (for example printed circuit board made of FR4 material), i.e. a connector of the type obtained from conductive tracks deposited on an insulating support, suitably shaped and close to the edge of the printed circuit board. In this manner, the electric connector of the device 1 may be coupled, as a matter of fact, to a typical female connector for a printed circuit board.

For mounting purposes, the circuit 30, already provided with the terminals 26, is inserted into the respective seat 39 of the support 35 and the unit thus obtained is inserted into the body 2a, such that the portions 26c of the terminals fit into respective passages 21a, until they reach close or abut against the step 25d of the wall 25c (see for example FIG. 27). In the condition thus assembled, the transverse passages 53 of the support 35 are in axis with the holes 52a, 52b of the cylindrical wall 4a of the body 2a. The support 35, and thus the circuit 30, the terminals 26 and the sensor 17, may be preventively mechanically constrained to the body 2a, through at least one stop element, indicated with 54 in FIGS. 25-29, consisting herein in a substantially U-shaped fork. The two parallel arms 54a of this fork 54, having a circular section herein, are intended to be fitted through the holes 52a, 52b of the cylindrical wall 4a, i.e. in a direction substantially perpendicular to the axis of the chamber 6. In this manner, an intermediate section of each arm 54a is inserted into a respective passage 53 of the support 35, therebetween constraining the support itself to the body 2a. The fork element 54 is inserted until its circle-arc-shaped connection part 54b is engaged into the groove 52 obtained in the cylindrical wall 4a of the body 2a. The mechanical constraint thus obtained advantageously allows preventing also possible unwanted angular movements of the assembly formed by the sensor 17, the support 35 and the circuit 30 with respect to the body 2a; this is particularly useful even regarding the case illustrated, wherein the terminals 26 are not directly fixed to the circuit 30, for example when flexible contact elements of the type indicated previously with 27 are operatively interposed between the circuit and terminals.

Figure 29:
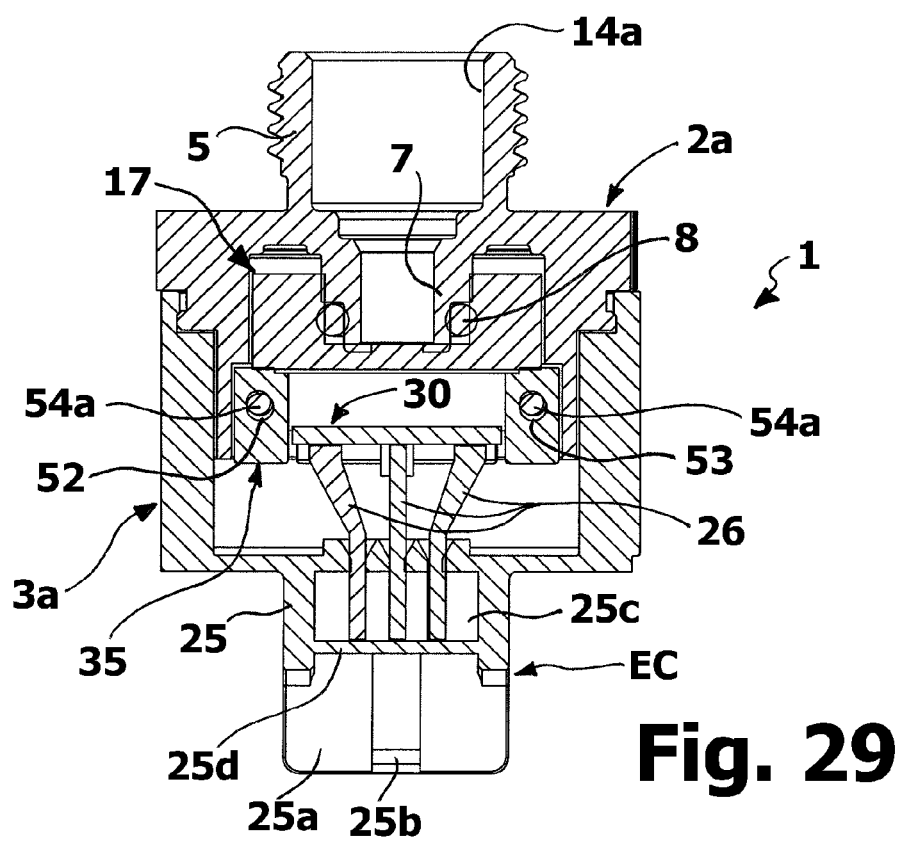

After blocking the abovementioned assembly to the body 2a, the bodies 2a and 3a may be coupled to each other, preferably but not necessarily in a sealing manner, in the configuration observable for example in FIGS. 28 and 29. Also in the present version of embodiment, other elements equivalent to the ones described previously, such as for example one or more ventilation passages, may be provided for.

In an embodiment, it is thus possible to preventively mechanically constrain, in an accurate and definite manner, the unit made up of the circuit 30, the spacer support 35 and the sensor 17 to the body 2a, in such a manner to facilitate the manipulation of the preassembled unit in the production step, for example through automated equipment, as well as the successive step of coupling to the body 3a, in a manner analogous to the one described. The means for mechanically constraining the support 35 to the body 2a may comprise, alternatively to the fork 54, one or two distinct pins, which serve as arms 54a, or a welding or other methods for mutual fixing between the parts, for example gluing.

Figure 30:
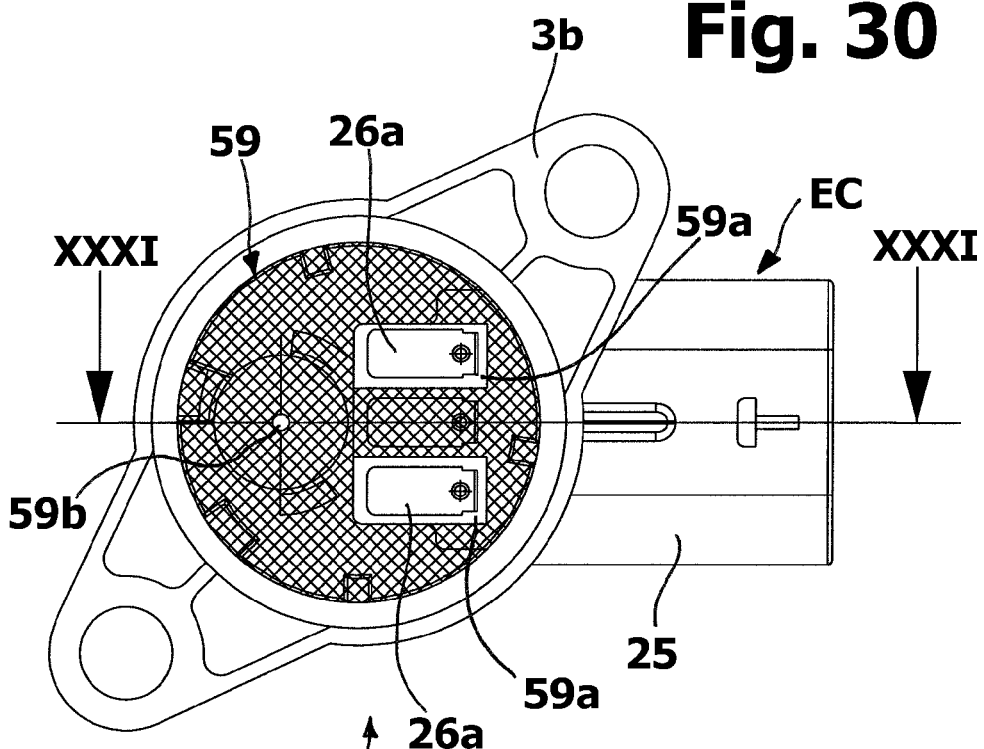
FIGS. 30 and 31 are a plan view and a transverse section of a body of the device of FIGS. 12 and 13, according to a possible variant.
Figure 31:
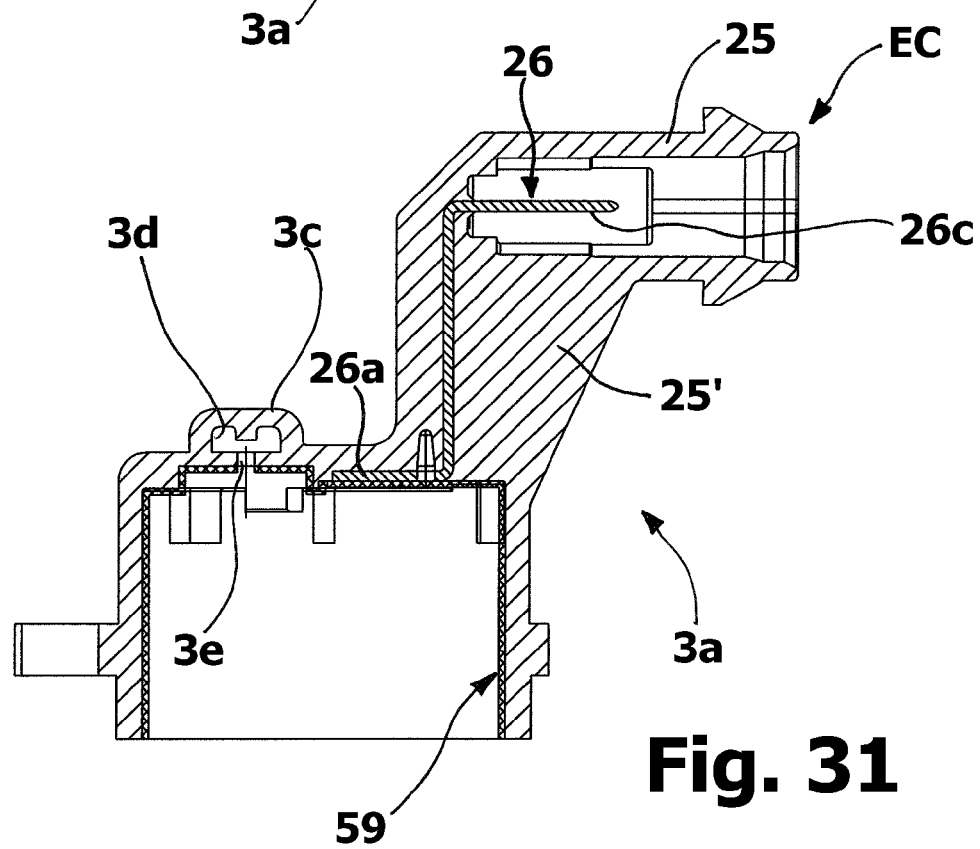

FIGS. 30 and 31 illustrate a particularly advantageous embodiment of a casing part of a device according to the invention, such as the body 3a of FIGS. 12-16, provided with means for shielding against noise due to electromagnetic interferences (EMI). In the illustrated example these means are obtained from a layer 59 made of electrically conductive material, deposited on the internal surface of the hollow region 20 of the body 3a excluding some regions, and specifically regions exposed to the risk of short-circuiting and possible regions in which aeration spaces are provided for. In particular, as observable in FIG. 30, the layer 59 is deposited in such a manner to leave regions 59a of the internal surface of the body 3a that surround the portions 26a of some of the terminals 26 free or exposed, in such a manner to avoid possible contacts between the terminals themselves and the layer 59a, and a region 59b at the gap 3e. The layer 59 is instead at contact with the portion 26a of the terminal 26 illustrated in central position, in order to obtain an electrical contact or connection with said central terminal, which is electrically connected to the electric potential adapted to provide the abovementioned shielding, preferably a ground or earth potential; the electrical connection of the layer 59 may however be obtained also in another manner and/or with terminals 26 shaped and positioned differently with respect to the one illustrated in the figure.

The material of the layer 59 may conveniently be in form of paint, ink, paste or electrically conductive plastic; with the aim of depositing the material, during the production step, it is preferable to use suitable equipment, such as a mask configured in such a manner to have the parts that cover the regions 59a, 59b wherein the presence of the layer 59 should be avoided and parts open at the regions where the layer 59 should be present. According to a possible variant embodiment, the layer 59 is moulded or overmoulded to the body 3a, instead of being deposited thereonto in form of paint, ink or paste; suitable moulds and/or moulding equipment are provided for such purpose. When shielding against interferences is obtained through moulding, electrically conductive thermoplastic material is preferably used; said electrically conductive thermoplastic material could also form at least part of the casing of the device according to the invention.

Provision of means for shielding against electromagnetic interferences may be provided for in all embodiments of the pressure sensor described herein.

FIGS. 32-33 schematically represent a further possible embodiment of the invention, according to which at least one of the two bodies which form the casing of the device is made of metal material. In the illustrated example the device has an axial development, or the electrical connection part—represented by the connector EC—and the hydraulic connection part—represented by the pressure port—are extended axially according to a common axis. Also in FIGS. 32-33 the same reference numbers of FIGS. 1-31 are used to indicate elements technically equivalent to those previously described and illustrated.

The body 2a, defining the pressure port, is made of metal material, without prejudice to its general characteristics and functionalities as described previously. According to this embodiment the mutual fixing between the bodies 2a, 3a of the casing of the device 1 is obtained by mechanically deforming a body with respect to the other: in the illustrated example the clinching of an end part of the peripheral wall 10 of the body 2a onto the peripheral wall 22 of the body 3a is provided for; in this embodiment, operative between the two bodies 2a-3a is also a seal means, such as an o-ring gasket (observable in FIG. 33, not indicated by reference numerals).

The body 3a is made of plastic material and the terminals 26 are preferably fitted into such body; alternatively, the body 3a may be overmoulded to the terminals 26. In the illustrated embodiment, the part 26c of the terminals 26 projecting into the tubular portion 25 that forms the connector EC has a circular section; the part of the same terminals inside the chamber 20 in which the sensor 17, the support 35 and the circuit 30, non shown, are accommodated instead has a flat shape, so as to cooperate with the flexible contact elements 27, as described previously.

As observable in FIG. 33, the respective positioning and/or polarisation between the spacer support 35 and the body 2a provides for the presence of one or more recesses 37 in the body of the support 35, intended to receive a respective internal projection 4c of the wall 4a of the body 2a.

Like in the previous embodiments also provided for are suitable means for mutual engagement on the bodies 2a and 3a, not shown (for example a throat or seat of one of the two bodies into which a protrusion or projection of the other body is intended to be inserted in an unambiguous manner), to determine the correct respective orientation or polarisation between the two parts of the casing of the device. In the illustrated example the tubular portion 25 externally has recesses or seats 25e with a helical or at least partially tilted development, being part of coupling or quick coupling system, for example of the bayonet coupling type.

As observable, in the various embodiments described, the device essentially comprises three main parts, i.e.:

the body 2a, that forms the pressure port, intended to come into contact with the fluid subject to measurement, and which defines the positioning of the active part of detection, the active part of detection, i.e. the pressure/voltage transducer unit which includes the pressure sensitive element, represented by the sensor 17, and the respective circuit arrangement, represented by the circuit 30, with the possible electronic element for processing the signal generated by the sensitive element, and the body 3a, that forms the casing for protecting the active part, and which, through its integrated electrical terminals, allows electrical connection between the pressure/ voltage transducer unit and a connection wiring.

According to a preferential characteristic of the device, the sensor 17 is not rigidly coupled or fixed to the body 2a. For such purpose, in the various configurations, the sensor 17 is mounted elastically through seal means 8; it should be observed that in this manner, the sensor body 17' also has the possibility to move with respect to other internal parts of the device, such as the support 35, the circuit 30, the elements 27, the terminals 26.

The electrical connection between the transducer unit, and specifically its circuit 30, and the casing of the device is preferably obtained through the flexible contact elements 27, welded to the board of the circuit, and thus actually integrated in the transducer unit. For this purpose, the electrical terminals integrated in the casing of the device, that might be both subjected to turning or blanking, preferably have, in the respective part inside the casing, a substantially flat-shaped surface, in such a manner to be coupled with the abovementioned contact elements 27. As mentioned, the contact elements 27 are preferably of the type blanked and shaped in such a manner to recover the assembly tolerances, and be compressed to guarantee a sufficient pressure contact against the flat part of the electrical terminals. It should be observed that these functionalities are obtainable also in other embodiments, not illustrated, in which the body of the pressure sensor is rigidly fixed to the casing.

The circuit part of the pressure/voltage transducer unit, represented by the circuit 30, is spaced, and thus mechanically separated, with respect to the sensor 17 through the spacer support 35 (obviously except for the terminals 19, actually at least slightly flexible); as observed, this confers to the entire transducer unit a considerable mechanical sturdiness, with the possibility of manipulation using simple and inexpensive production equipment. It should be observed that these advantages are obtainable also in other embodiments, not illustrated, wherein the body of the pressure sensor is rigidly fixed to the casing. The spacer support 35 may be made of plastic or metal material and it has projections and/or slots serving to couple it in a correct manner and in the correct position with respect to the casing of the device. The support 35, with its seats and/or projections, further defines the positioning of the circuit 30 which is mechanically separated from the casing of the device, and simultaneously serves as an abutment against the part 2a of the casing during the assembly operations.

An additional advantage with respect to those already described is that in given embodiments—and specifically those in which the support 35 is anchored, engaged, glued, welded or associated through mechanical clinching to the body part 2a defining the fluid inlet—allow a partial preassembly of the sensor device, in particular with the aim of allowing safe manipulation, without the risk of losing components: this characteristic may be very useful regarding the performance of test and/or calibration operations during the production cycle, also before the final assembly of the device 1.

Though having different shape in the various embodiments described, the bodies 2a, 3a and 70, 72 that form the casing or structure of the device, have such geometry to allow them to be formed through injection moulding of thermoplastic material.

It is possible to provide for that transmission and/or reception of data between the device according to the invention and a respective control unit occurs through wireless transmission means, for example through radio frequency: in such case, alongside the circuit 30 for possible processing of the signal, the device also incorporates a transmitter and/or receiver circuit and a battery or power supply electrical connections; in such manner, the device may for example transmit the measurement data and/or receive configuration or programming data.

It should also be observed that the sensor devices described may be used as devices for measuring the pressure generated by a liquid head, for example for measuring the level of a liquid inside a tank. In such use, the sensor device may be arranged in proximity to the bottom of the tank and hence measuring the height of the liquid present in the tank by simply measuring the pressure generated thereby, by knowing the density of the liquid. In such type of use the abovementioned wireless transmission is advantageously useable.

It is clear that numerous variants are possible for the pressure sensor devices described for exemplification purposes, without departing from the scope of the invention as defined in the claims that follow. It is also clear to a man skilled in the art that the characteristics described and illustrated with reference to a specific embodiment are also useable in other embodiments described, i.e. the characteristics of the different embodiments are variously combinable, also to obtain devices different from those illustrated for exemplification purposes. For example, the mechanical constraint between the support 35 and the body 2a described with reference to the embodiment of FIGS. 23-29 is also easily applicable to the embodiments of FIGS. 1-22.

Figure 34:
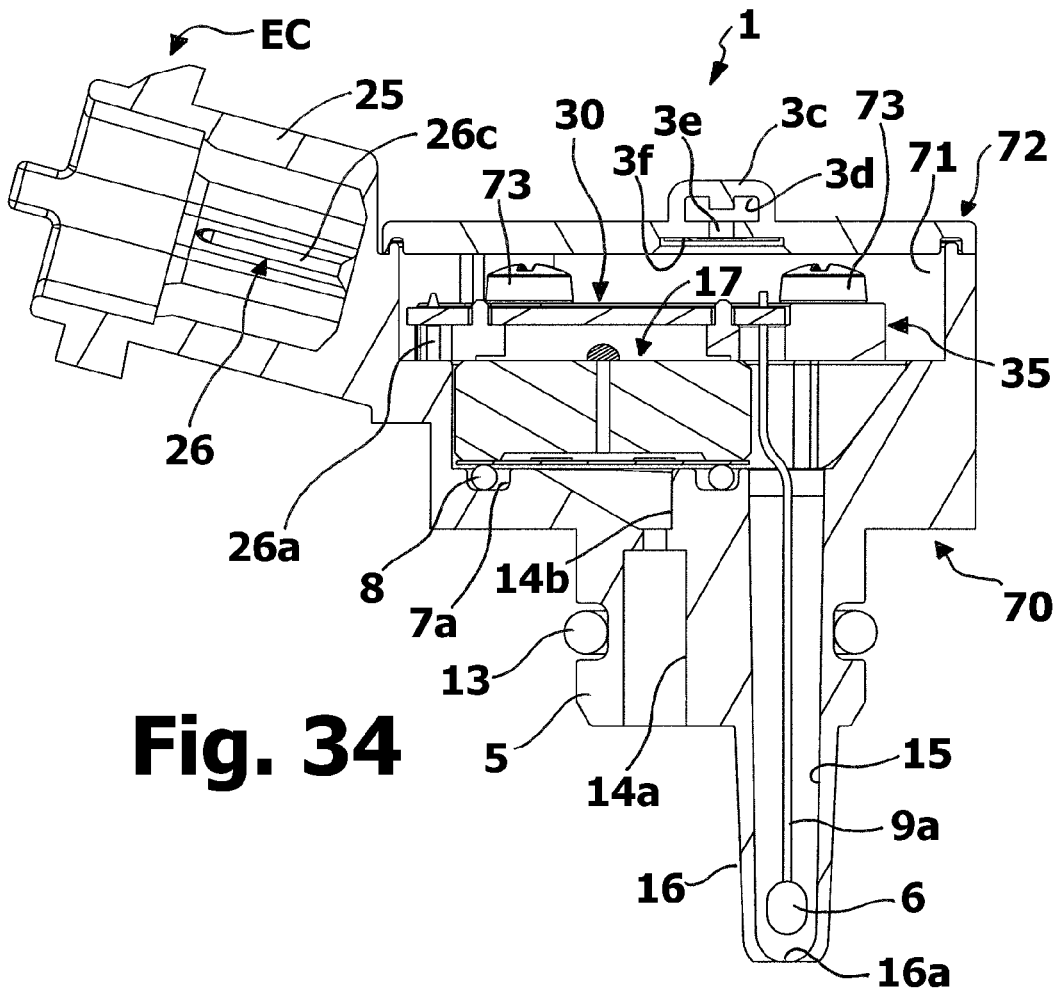
FIG. 34 is a schematic section of a pressure sensor device according to a further inventive embodiment.
Figure 35:
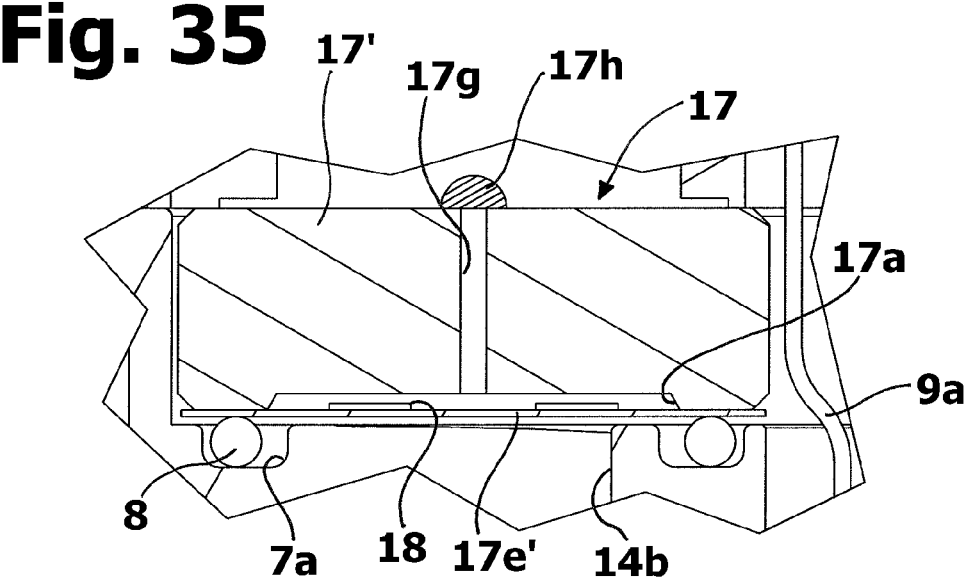
FIG. 35 is an enlarged detail of FIG. 34.

FIGS. 34 and 35 show a variant embodiment of the invention, in which the device is provided with a pressure sensor of the absolute type. In such figures the same reference numbers of FIGS. 1-33 are used to indicate elements technically equivalent to those described and illustrated previously. The device with a pressure sensor of the absolute type may also provide for a temperature sensor, as in the example illustrated in FIGS. 34-33 and similarly to the case of the embodiment of FIGS. 1-11.

In the embodiment of FIGS. 34-35 the device 1 comprises a main body which substantially obtains the functions of the bodies indicated previously with 2a and 3a.

Such main body, indicated in its entirety with 70, has the respective hydraulic connection portion 5, provided with a seat for the gasket 13, and the tubular portion 25 intended to obtain, alongside the terminals 26, the connector EC for the electrical connection of the device. Defined in the body 70 is a main cavity, indicated with 71. For the accommodation of the pressure sensor 17, of the support 35 and of the circuit 30, on the bottom of such chamber 71 opening the two passages 14a-14b and 15. Should the device be used for detecting the pressure of fluids aggressive against the temperature sensor 9, the latter may be insulated against direct contact with the fluid through a lower thin closure wall 16a, obtained in the appendage 16, which in this case shall be without the lateral holes. The chamber 71 is closed at the upper part by means of a cover 72.

As mentioned, the sensor 17 is of the type adapted to measure absolute pressure, i.e. referred to the pressure of a chamber inside the sensor itself. For this purpose, the sensor 17 has a main body 17' with respective reference cavity 17a, which is closed by means of a thin membrane added, indicated with 17e', for example glued to the lower part of the face of the body 17 which surrounds the opening of the cavity 17a. Also in this case, the abovementioned membrane 17e' supports the measurement means 18, for example in form of one or more resistors, on the internal side of the chamber 17a. The resistor ends or the resistors 18 are connected, to the opposite part of the body 17', by means of metallised internal holes of the body itself, not shown in the figure; the vacuum or reference pressure is created in the reference cavity or reference chamber 17a through a central hole 17g of the body 17', having an end facing into the chamber itself. The hole 17g is then closed at the opposite end by means of suitable upper sealing 17h, for example with a drop of impermeable material, as schematised in the figure. Generally, the structure of the sensor 17 may be similar to that described in EP-A-0 831 315. When required, an absolute pressure sensor may also be used in the other embodiments described herein.

Also in this embodiment, the sensor 17, or its body 17' comprising the membrane 17e', is not rigidly coupled to the casing or structure of the device 1, or it is mounted in an elastic manner with respect thereto, through the gasket 8. However, given the different structure of the sensor 17 described, it is necessary to use a different configuration of the gasket 8, which cannot operate on the internal cylindrical surface of the body 17' of the sensor, but must operate in an axial manner on the membrane 17e'. In this case the tubular part 7 of the previous embodiments is not present and the conduit section 14b is made with a substantially flared or cone-shaped cavity, opening on the membrane 17e'. The region in which the pipe section 14b opens on the bottom of the chamber 71 is circumscribed by a seat 7a, in which the axial seal gasket 8 is positioned, preferably but not necessarily coaxial or centred with respect to the axis of the pressure sensor.

The terminals 26 are generally flattened and are shaped in such a manner to have a connection end 26a having a restricted section, and preferably generally sharp pointed, an intermediate portion with multiple folds, not shown, and a straight end portion 26c, intended to be extended into the tubular portion 25, to obtain the connector EC therewith. In the example, the terminals 26 are shaped such that the ends 26a are at least approximately perpendicular with respect to the circuit 30. With the aim of obtaining the device, the material forming the body 70, preferably thermoplastic material that can be injection-moulded, is overmoulded to the terminals 26, in such a manner that the ends 26a of the terminals themselves are extended substantially vertically inside the chamber 71, as observable in FIG. 34.

In this embodiment, the preassembled pressure/voltage transducer unit, or the pressure sensor 17 and the circuit 30 (also provided with the temperature sensor 9 in this case), with the spacer support 35 interposed, is inserted into the chamber 71 in such a manner that the temperature sensor 9 is fitted into the passage 15 and the membrane 17e' of the sensor 17 elastically abuts against the gasket 8. The support 35 is thus fixed in position inside the chamber 71, through screws 73 or similar threaded members. After the described positioning, the sharp pointed ends 26a of the terminals 26 are inserted into the respective connection holes of the board of the circuit 30, where they are subsequently welded. As mentioned, the ends 26a have a restricted section with respect to the successive portion of the respective terminal: in such manner, at the lower part of the abovementioned sharp pointed ends, a step or an abutment surface for the board 31 is defined. Therefore, the elastic contact elements 27 are not provided for in this embodiment. Possibly, material, such as synthetic resin, for protection against oxidation and/or corrosion is applied onto the ends 26a of the terminals 26 welded to the circuit 30, and also on the ends of the rheophores 9a welded to the circuit 30.

The chamber 71 is thus closed by fixing the cover 72, that can be glued or welded to the body 70, for example through laser welding.

In this embodiment, the cover 72 is provided, in the external part thereof, with a channelling 3c, substantially analogous to the one described previously with reference to the embodiment of FIGS. 12-16. The internal passage 3d of the channelling 3c communicates, through the gap 3e, with the internal of the chamber 71 of the device 1, communicating such chamber 71 with the external environment, for ventilation purposes. The membrane 3f permeable to air but not moisture, adapted to prevent the entry of moisture into the device 1 is mounted on the internal side of the cover 72, at the gap 3e (for example glued).

Also the embodiment of FIGS. 34-35 facilitates the obtainment of the device 1, whose casing is largely obtainable through a single operation of moulding thermoplastic material onto the terminals 26 and the transducer unit may be positioned by simple movement in the cavity 71, with the ends 26a of the terminals 26 that serve as further positioning and/or polarising elements in this step.

In possible embodiments alternative to those described, the flexible contact elements 27 described and illustrated may be replaced by elements having analogous functions, but configured differently, for example substantially in the form axially extended helical springs, preferably having at least one turn with a larger diameter with respect at an end thereof and/or with at least one end flattened by grinding the end turn.

In other embodiments the casing of the device may be configured in such a manner to have more than two parts, in such case it is also possible to provide for that the body 17' of the sensor partially projects outside the detection chamber 20 or 71.

In further variants the circuit 30 may be connected to the pressure sensor 17 through connections of the "Ball Grid" type, that allow eliminating the vertical terminals 19 of the sensor itself, replacing them with tin balls, commonly used on "Ball Grid Array" devices, arranged on a printed circuit board; for such purpose, the pressure sensor and/or the printed circuit board may be provided with pads or conductive tracks and the connection between the printed circuit board and the conductive tracks, for example silk-printed on the ceramic sensor, is preferably obtained by means of the traditional process of reflow welding, or through heating adapted to melt said tin balls or a welding alloy.

Reference to a given "embodiment" "or solution" in this description indicates that a particular configuration, structure or characteristic described regarding the embodiment is included in at least one inventive embodiment or solution. Hence, expressions such as "embodiment", possibly present in various parts of this description do not necessarily refer to the same embodiment. Furthermore, particular configurations, structures or characteristics may be combined in any suitable manner in one or more embodiments.

The invention claimed is:

1. A pressure sensor device comprising:
    a casing defining a chamber and an inlet passage of the chamber,
    a pressure sensor having a sensor body with a cavity and a membrane, the sensor body being accommodated in the chamber such that the membrane is susceptible to deformation under pressure of a fluid present in the inlet passage,
    a circuit arrangement to which the pressure sensor is electrically connected, the circuit arrangement including a circuit support at least partially accommodated in the chamber,
    wherein the sensor body is not rigidly associated to the casing and/or other parts of the device, and is mounted elastically or in a moveable manner with respect to the casing and/or to said other parts inside the chamber,
    wherein accommodated in the chamber is a positioning body, configured as a separate component with respect to the pressure sensor, to the circuit support and to the casing, the positioning body being at least partially interposed between the sensor body and the circuit support,
    wherein the circuit arrangement comprises an electric connector including connection terminals each having a first portion which is extended inside the chamber and a second portion which is extended outside the chamber and wherein operatively interposed between the first portion of the terminals and the circuit support are elastic contact elements, adapted to elastically press the circuit support onto the positioning body,
    wherein the positioning body is arranged in the chamber spaced apart from the first portion of the terminals and the elastic contact elements are configured and arranged to extend in a compression condition between the first portion of the terminals and the circuit support, and
    wherein the device further comprises a temperature sensor, electrically connected to the circuit support, for detecting a temperature of a fluid.

2. The device according to claim 1, wherein the contact elements each have a substantially flat base part, rising from which is an elastically flexible portion whose top part abuts against the first portion of a respective terminal, the base part of each contact element being electrically connected to a respective pad provided at the end of a conductive tracks on a surface of the circuit support.

3. The device according to claim 1, wherein mounted on the circuit support are
components for amplifying and/or treating and/or processing and/or conditioning signals generated by the pressure sensor.

4. The device according to claim 1, wherein the sensor body is in a position spaced apart with respect to the circuit support inside the chamber.

5. The device according to claim 1, wherein the sensor body is mounted elastically with respect to the casing through a seal element, wherein the seal element comprises a gasket directly interposed between the sensor body and the casing.

6. The device according to claim 5, wherein the positioning body has at least one of
an axial cavity to which the membrane is faced;
a body having a peripheral profile comprising at least two substantially rectilinear walls or faces, particularly a substantially quadrangular shape;
a recess for receiving at least part of the circuit support;
one or more elements for coupling to the circuit support, particularly in form of projections;
one or more elements for coupling to the sensor body, particularly in form of projections;
one or more elements for coupling to the casing;
one or more elements for coupling both to the sensor body and to the casing.

7. The device according to claim 5, wherein the casing is made up of at least one first and one second casing part coupled together and the positioning body is mechanically constrained to the casing.

8. The device according to claim 7, wherein the positioning body is mechanically constrained to the casing by at least one of:
welding or gluing to the first part of the casing;
mechanical deformation of the first part of the casing with respect to the positioning body, or vice versa;
interposition of at least one portion of the positioning body between the first and the second part of the casing;
mutual engagement of the positioning body and of the first part of the casing.

9. The device according to claim 5, wherein the casing comprises reference and/or positioning means for at least one of the positioning body, the sensor body, the circuit support and elastic contact elements.

10. The device according to claim 1, wherein the casing comprises a first and a second casing part made integral with each other through at least one of welding, riveting, engagement, screwing, coupling and gluing one part of the casing with respect to the other.

11. The device according to claim 1, further comprising a layer of electrically conductive material on a surface of the casing defining at least part of the chamber.

12. The device according to claim 1, wherein the casing has at least one gap or passage for placing the chamber in communication with the external environment, associated to the gap or passage being respective protection elements.

13. The device according to claim 1, comprising a plurality of connection terminals each having a first portion which is extended inside the chamber and a second portion which is extended outside the chamber, and wherein the casing comprises a wall substantially parallel and adjacent to the second portion of the terminals, such wall having a step at a respective end, abutting on which is an end of the terminals of the respective second portion, the second portions of the terminals, the wall and the step having respective dimensions and/or positions such that a surface of the second portions of the terminals is substantially flushed with an edge of the step.

14. A pressure sensor device comprising:
a casing defining a chamber and an inlet passage of the chamber,
a pressure sensor having a sensor body with a cavity and a membrane, the sensor body being accommodated in the chamber such that the membrane is susceptible to deformation under pressure of a fluid present in the inlet passage,
a circuit arrangement to which the pressure sensor is electrically connected, the circuit arrangement including a circuit support at least partially accommodated in the chamber,
wherein the sensor body is not rigidly associated to the casing and/or other parts of the device, and is mounted elastically or in a moveable manner with respect to the casing and/or to said other parts inside the chamber,
wherein accommodated in the chamber is a positioning body, configured as a separate component with respect to the pressure sensor, to the circuit support and to the casing, the positioning body being at least partially interposed between the sensor body and the circuit support,
wherein the circuit arrangement comprises an electric connector including connection terminals each having a first portion which is extended inside the chamber and a second portion which is extended outside the chamber and wherein operatively interposed between the first portion of the terminals and the circuit support are elastic contact elements, adapted to elastically press the circuit support onto the positioning body,
wherein the positioning body is arranged in the chamber spaced apart from the first portion of the terminals and the elastic contact elements are configured and arranged to extend in a compression condition between the first portion of the terminals and the circuit support, and
wherein the casing has a hydraulic connection portion extended in which is at least one section of the inlet passage, further formed in the connection portion being a passage or seat for the temperature sensor and/or for terminals thereof for connecting to the circuit support.

15. A pressure sensor device comprising:
a casing defining a chamber with an inlet passage for a fluid,
a pressure sensor having a sensor body with a detection membrane, the sensor body being at least partially accommodated in the chamber,
a circuit arrangement to which the pressure sensor is electrically connected, the circuit arrangement including a circuit support at least partially accommodated in the chamber,
a plurality of connection terminals each having a first portion which is extended inside the chamber and a second portion which is extended outside the chamber,
wherein the casing comprises a wall substantially parallel and adjacent to the second portion of the terminals, such wall having a step at a respective end, abutting on which is an end of the terminals of the respective second portion, the second portions of the terminals, the wall and the step having respective dimensions and/or positions such that a surface of the second portions of the terminals is substantially flushed with an edge of the step.

16. A pressure sensor device comprising:
a casing defining a chamber with an inlet passage for a fluid, a pressure sensor having a sensor body with a detection membrane, the sensor body being at least partially accommodated in the chamber, a circuit arrangement to which the pressure sensor is electrically connected, the circuit arrangement including a circuit support at least partially accommodated in the chamber, the device having at least one of:

a spacer body accommodated in the chamber and configured as a separate component with respect to the pressure sensor, to the circuit support and to the casing, the spacer body being at least partially interposed between the sensor body and the circuit support;

at least one seal element or gasket for elastically mounting the sensor body with respect to the casing and/or to other parts of the device inside the chamber;

a sensor body in a position spaced apart with respect to the circuit support inside the chamber;

an electric connector including connection terminals each having a first portion which is extended inside the chamber and a second portion which is extended outside the chamber and wherein operatively interposed between the first portion of the terminals and the circuit support are flexible contact elements, the flexible contact elements being configured and arranged to be in a compression condition between the first portion of the terminals and the circuit support;

a body accommodated inside the chamber for positioning at least one of the circuit support and the sensor body, the positioning body being configured as a distinct part with respect to the casing and comprising reference and/or positioning means for at least one of the sensor body and the circuit support;

at least one first and one second casing parts coupled together, and a positioning body for at least one of the circuit support and the sensor body accommodated inside the chamber, the positioning body being mechanically constrained to at least one casing part;

a layer of electrically conductive material on a surface of the casing defining at least part of the cavity;

at least one gap or passage in the casing for placing the chamber in communication with the external environment, wherein a protection means is associated to the gap or passage.

17. The device according to claim 16, wherein the casing comprises at least one first and one second casing part made integral to each other through laser welding.

18. The device according to claim 16, further comprising a temperature sensor, electrically connected to the circuit support, for detecting the temperature of the fluid.

19. A pressure sensor device comprising:

a casing defining a chamber with an inlet passage for a fluid, a pressure sensor having a sensor body with a detection membrane, the sensor body being at least partially accommodated in the chamber, a circuit arrangement to which the pressure sensor is electrically connected, the circuit arrangement including a circuit support at least partially accommodated in the chamber, the casing is provided with at least one passage for placing the chamber in communication with the external environment, for ventilation purposes and/or for providing reference environmental pressure, the passage having respective protection means, wherein the passage comprise a through-hole extending from an inner side to an outer side of a wall of the casing and the protection means comprise a channelling in communication with said through-hole, the channelling being integrally formed with said wall of the casing and extending longitudinally in a transverse direction relative to the through-hole, the channel being longer that the through hole and having at least one open end.

20. The pressure sensor device according to claim 19, wherein the channelling has two opposite open ends, wherein one end projects from the outer side of said wall of the casing and is substantially orthogonal to said through-hole.

* * * * *